(12) United States Patent
Ogasawara

(10) Patent No.: US 6,512,919 B2
(45) Date of Patent: Jan. 28, 2003

(54) ELECTRONIC SHOPPING SYSTEM UTILIZING A PROGRAM DOWNLOADABLE WIRELESS VIDEOPHONE

(75) Inventor: Nobuo Ogasawara, San Diego, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/281,557

(22) Filed: Mar. 30, 1999

(65) Prior Publication Data

US 2002/0065728 A1 May 30, 2002

Related U.S. Application Data

(63) Continuation-in-part of application No. 09/211,308, filed on Dec. 14, 1998.

(51) Int. Cl.$^7$ .......................... H04Q 7/20; G06K 15/00; G06F 17/60; H04N 7/14
(52) U.S. Cl. ...................... 455/422; 235/383; 235/385; 186/61; 705/23; 455/403; 348/14.01
(58) Field of Search .............................. 705/23, 26, 16, 705/17; 379/14; 455/3.03, 3.05, 403, 405, 406, 409, 410, 411, 414, 418, 419, 422; 235/383, 385; 709/217, 224; 186/52, 61; 348/14.01, 14.02, 14.04

(56) References Cited

U.S. PATENT DOCUMENTS

| 5,410,326 A | 4/1995 | Goldstein |
| 5,424,524 A | 6/1995 | Ruppert et al. |
| 5,594,779 A | 1/1997 | Goodman |

(List continued on next page.)

FOREIGN PATENT DOCUMENTS

| EP | 0843290 A2 | | 5/1998 | |
| EP | 0865219 A2 | | 9/1998 | |
| NL | 9002296 | | 10/1990 | |
| WO | WO-97/50222 | | 12/1997 | |
| WO | 99/46706 | * | 9/1999 | ........... G06F/17/60 |

OTHER PUBLICATIONS

Blankenhorn, D., 'Phones win Headlines during CES Week', Newsbytes, May 28, 1992.: Dialog Information Services, file 275: Gale Group Computer DB (TM), Dialog Accession # 01516628.*
Nuttall, N., 'First the PC, now the Videophone', Times of London (TL), Apr. 24, 1992. Retrieved from: Dialog Information Services, file 710: Times/Sun. Times (London), Dialog Accession # 06875280.*
Fenner, E., 'AT&T: The Store without Walls', Money, v22, n12, pp. 88–96, Dec. 1993. Retrieved from: Dialog Information Services, file 15: ABI/Inform ®, Dialog Accession # 00788284.*
Radio Communications Report, v 18, n 48, p. 24 "Millicom releases GSM online payment system." Nov. 29, 1999.
Business Wire, "Lava2140 Introduces Wireless E–commerce Application at PCS '99; E–Shop Mobile Delivers Unified Internet and Wireless Shopping Solution" Sep. 23, 1999.
Newsbytes News Network, "France Telecom Readies E–Commerce By Phone Service", Feb. 24, 1999.

Primary Examiner—Richard Chilcot
Assistant Examiner—Andrew Joseph Rudy
(74) Attorney, Agent, or Firm—Christie, Parker & Hale, LLP

(57) ABSTRACT

An electronic shopping system facilitates purchase transactions via a wireless videophone. A purchase transaction program is downloaded from the seller's server to a purchaser's wireless videophone via a program loader contained within the purchaser's wireless videophone. The purchase transaction program is stored in a program memory and is used by the purchaser to facilitate the selection of items to be purchased, as well as payment therefor. An integral digital camera is attached to the wireless telephone to facilitate the selection of items to be purchased and is controlled via the downloaded purchase transaction program to function as a bar code or product icon image capture device. Character or pattern recognition software translates the bar or icon code image into an appropriate item identifier.

58 Claims, 13 Drawing Sheets

U.S. PATENT DOCUMENTS

| | | | |
|---|---|---|---|
| 5,606,361 A | * 2/1997 | Davidsohn et al. | 348/14 |
| 5,722,069 A | 2/1998 | Donner | |
| 5,724,092 A | * 3/1998 | Davidsohn et al. | 348/14 |
| 5,825,002 A | 10/1998 | Roslak | |
| 5,832,115 A | * 11/1998 | Rosenberg | 382/199 |
| 5,867,712 A | * 2/1999 | Shaw et al. | 395/704 |
| 5,918,211 A | 6/1999 | Sloane | 705/16 |
| 5,970,473 A | * 10/1999 | Gerszberg et al. | 705/26 |
| 6,055,513 A | * 4/2000 | Katz et al. | 705/26 |
| 6,085,176 A | * 7/2000 | Woolston | 705/37 |
| 6,124,882 A | * 9/2000 | Voois et al. | 348/15 |
| 6,134,548 A | 10/2000 | Gottsman et al. | 705/26 |
| 6,144,848 A | 11/2000 | Walsh et al. | 455/419 |
| 6,199,753 B1 | * 3/2001 | Tracy et al. | 235/375 |
| 6,202,051 B1 | * 3/2001 | Woolston | 705/27 |
| 6,226,031 B1 | * 5/2001 | Barraclough et al. | 348/14.13 |
| 6,313,864 B1 | * 11/2001 | Tabata et al. | 348/14.02 |
| 6,314,406 B1 | * 11/2001 | O'Hagan | 705/14 |
| 6,377,570 B1 | * 4/2002 | Vaziri et al. | 370/352 |

* cited by examiner

*FIG. 9*

| Phone number | Telephone type | Download Program ID | Password | Customer ID | Customer name | Other customer profile information |
|---|---|---|---|---|---|---|
| | | | | | | |
| | | | | | | |
| | | | | | | |
| | | | | | | |
| | | | | | | |
| | | | | | | |

ELECTRONIC SHOPPING SYSTEM UTILIZING A PROGRAM DOWNLOADABLE WIRELESS VIDEOPHONE

CROSS-REFERENCE TO RELATED APPLICATIONS

The present application is a continuation-in-part of co-pending application Ser. No. 09/211,308, filed Dec. 14, 1998 entitled ELECTRONIC SHOPPING-SYSTEM UTILIZING A PROGRAM DOWNLOADABLE WIRELESS TELEPHONE, commonly owned by the Assignee of the present invention, the entire disclosure of which is expressly incorporated herein by reference.

FIELD OF THE INVENTION

The present invention relates generally to electronic shopping systems and, more particularly to an electronic shopping system which utilizes a program downloadable wireless video phone as a purpose-type dedicated terminal which enables a shopper to capture, recognize and decode captured images.

BACKGROUND OF THE INVENTION

Electronic shopping systems for allowing a shopper to purchase products without necessarily having to travel to a store are well known. One example of a contemporary electronic shopping system is a cable television shopping channel, wherein products are advertised on television. A shopper merely watches the television and when an item is shown for which a purchase is desired, the shopper uses a telephone to call an agent of the seller to place an order for the desired product. Usually, a credit card number is given over the telephone to facilitate payment for the purchased item. The purchased product is then shipped directly to the buyer.

In an improved version of cable television shopping, an interactive or bidirectional cable system allows the purchaser to make selections directly from the television screen. This may be accomplished by using a menu driven system controlled by the television remote control. In this manner, the need to make a telephone call is avoided. The added convenience of shopping directly from the television is expected to enhance consumer response to such advertisements.

Similar to cable television shopping is the use of the Internet to make desired purchases from the home. Many companies presently offer their products for sale on the Internet, and the number doing so is increasing rapidly. Products as diverse as pizzas, books and automobiles can readily be purchased from the comfort of a person's home, simply by locating the web page of a company selling the desired item, selecting the item to be purchased, providing an address to which the item is to be delivered, and providing a credit card number to pay for the purchased item.

However, one disadvantage of such contemporary electronic shopping systems is that they require that the prospective purchaser subscribe to either cable television or to an Internet service, for which a subscription fee is charged. Further, such contemporary electronic shopping systems require that purchases be made from either the purchaser's television or computer, both of which are typically located in the purchaser's home and cannot usually be easily transported. Thus, the purchaser is undesirably constrained to shopping from the home.

Because of the highly mobile nature of modern society, it is desirable to provide the ability to conduct electronic shopping from locations away from the home. For example, a purchaser may wish to order items from the workplace, over lunch in a restaurant, while traveling, and in a variety of other, different circumstances wherein the purchaser does not have access to his or her home television or computer.

It is also known to use a personal shopping system (PSS) wherein the purchaser carries a scanner embedded hand-held terminal within a store. Bar codes of products to be purchased are scanned with the hand-held scanner. A display on the scanner embedded hand-held terminal displays an item price and a running total of the purchase prices of the products which have been scanned. Payment for the scanned products is accomplished at a checkout counter in a conventional manner.

However, contemporary personal shopping systems require the use of a dedicated personal shopping system terminal, which has a small display, a number keypad, and a built-in bar code scanner. Of course, the use of such a contemporary dedicated portable personal shopping system requires a substantial financial investment by the retailer in the portable personal shopping system terminals.

Wireless telephones, such as cellular telephones, are very popular. As the price of wireless telephones and the cost of making calls therewith continue to decrease, more people are purchasing and using wireless telephones.

As used herein, the term wireless telephone is defined to include mobile telephones, cellular telephones, satellite telephones and any other telephones not requiring a wired connection, such as cordless home telephones which have a limited range and must generally therefore be used close to the house.

In view of the low cost and ubiquitous nature of wireless telephones, it is desirable to provide a system for performing electronic shopping which utilizes a customer's own wireless telephone for the selection of items to be purchased, as well as for providing payment for such purchased items. By utilizing the customer's own wireless telephone for electronic shopping, rather than using a dedicated personal shopping system terminal, the substantial investment associated with the use of such dedicated personal shopping system terminals is eliminated.

Further, additional efficiencies can be realized if wireless telephones are provided with a graphic display, such as a small color or monochrome LCD display and a visual image capture device, such as a CCD digital camera, i.e., is configured as a wireless videophone. In this particular case, a wireless videophone is able to extend the capabilities of electronic shipping by eliminating altogether the requirement for dedicated terminals to scan machine-readable code, as well as reduce a vendor's investment in these dedicated terminals. Wireless videophones would, thus, provide the most cost effective way of accommodating an electronic shopping system since a customer need only carry a single, personalized commodity apparatus which serves multiple functions, including electronic shopping, thus minimizing the customer's investment.

SUMMARY OF THE INVENTION

The present invention specifically addresses and alleviates the above-mentioned deficiencies associated with the prior art. More particularly, the present invention comprises an electronic shopping system for facilitating purchase transactions via a wireless videophone to which a program download function, a downloaded program execution function and an integral digital camera and display screen have been added. However, since the functionality added to the wireless videophone is small, the wireless videophone is still capable of being produced as an inexpensive commodity product.

The electronic shopping system comprises a server and at least one wireless videophone for communicating with the server. Thus, according to one preferred embodiment of the present invention, once a customer visits a store, the customer simply dials the number of the store's personal shopping system service. The personal shopping system application is then automatically downloaded into the customer's videophone. The downloaded program automatically begins execution and provides the desired functionality of a personal shopping system. An integral digital camera is used to scan the images of bar codes of purchased items, and pattern recognition software resident either in the videophone or in the server, translates the bar code image data into an alpha-numeric product identification. Thus, the present invention allows retailers to implement a personal shopping system while minimizing the cost investment necessary to do so.

More particularly, according to the present invention a store maintains a server which provides a downloadable purchase transaction program to a purchaser's wireless videophone when the purchaser calls the store's server via the purchaser's wireless videophone. After downloading the purchase transaction program from the server to the wireless videophone, the server communicates with the wireless videophone so as to use the downloaded purchase transaction program to facilitate selection of the desired product(s) for purchase, as well as to facilitate payment therefore.

It is desirable to download the purchase transaction program into a wireless videophone as needed, rather than to permanently store the purchase transaction program in the wireless videophone, because downloading allows a plurality of different sellers to utilize their own programs, rather than requiring a single, universal program for all sellers. It should be appreciated that different sellers will desire to incorporate different messages, advertisements, menus, etc. into their own purchase transaction program and to further customize their own purchase transaction program so as to tailor it to the particular products being sold.

Further, since different types of wireless videophones are contemplated to have different displays, keypads, camera and display types, etc., it is desirable to download a purchase transaction program which is specifically tailored to a particular type of wireless videophone, so as to make the best use of that particular wireless videophone's features.

The purchase transaction program transmitted from the server to the wireless telephone is loaded into a program memory of the wireless videophone via a program loader of the wireless videophone. The program loader effects loading of the purchase transaction program into the program memory as the purchase transaction program is being transmitted from the server to the wireless videophone. The downloaded purchase transaction program contains instructions for facilitating product selection and payment via the wireless videophone. Thus, the purchase transaction program converts the wireless videophone into a point of purchase electronic shopping terminal.

Although the electronic shopping system of the present invention is described herein as being used to purchase products, those skilled in the art will appreciate that the electronic shopping system is likewise suitable for purchasing services, or anything else which is desired. Thus, use of the term "product" is by way of illustration only and not by way of limitation. Further, as used herein the term "store" is defined to include any seller of goods or services, including a retail store, a wholesale store, or any other vendor.

BRIEF DESCRIPTION OF THE DRAWINGS

These and other features, aspects and advantages of the present invention will be more fully understood when considered with respect to the following detailed description, appended claims and accompanying drawings, wherein:

FIG. 9 is a customer information table;

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The detailed description sets forth the construction and functions of the invention, as well as the sequence of steps for operating the invention in connection with the illustrated embodiment. It is to be understood, however, that the same or equivalent functions may be accomplished by different embodiments that are also intended to be encompassed within the spirit and scope of the invention.

Figure 1:
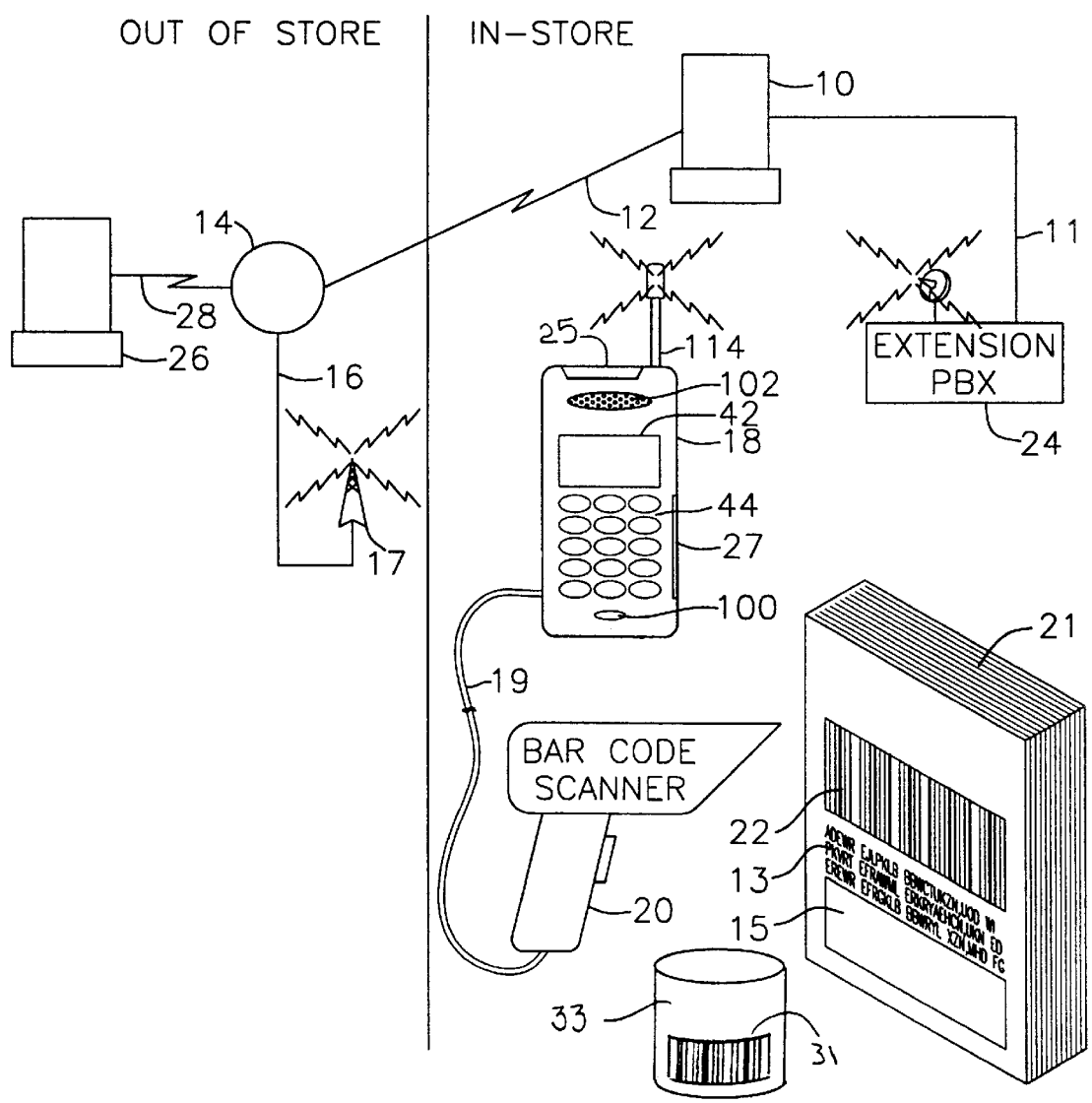
FIG. 1 is a schematic overview of the electronic shopping system of the present invention.

Referring now to FIG. 1, the present invention generally comprises a store server 10 in communication with a commercial telephone network 14, typically via a wire connection 12. Alternatively, the store server 10 may communicate with the commercial telephone network 14 via any other desired means, such as via fiber optics, radio signals, etc. Such commercial telephone networks are those commonly used to communicate voice and data both locally and over long distances. Example of such commercial telephone networks include Pacific Bell, General Telephone, AT&T, MCI and Sprint.

The commercial telephone network 14 facilitates connection of the store server 10 to a wireless telephone 18 via a cellular telephone network 17, to which the conventional telephone network 14 is in communication, typically via a wire connection 16. Examples of such cellular telephone networks include L.A. Cellular and Pacific Bell. Again, the wired connection 16 may alternatively comprise a fiber optic, radio or other means of communication.

The cellular telephone network 17 communicates with the wireless telephone 18 via radio transmission according to well known principles.

Alternatively, a remote server 26, rather than the store server 10, communicates with the wired telephone network 14, again preferably via a wire connection 28. The wire connection 28 may alternatively comprise fiber optic, radio, or other communication means.

Optionally, the store server 10 is in communication with an extension PBX 24 or the like, preferably via a wired connection 11. The extension PBX 24 communicates with the wireless telephone 18 via a radio connection.

Optionally, an external bar code scanner 20 communicates with the wireless telephone 18 via wire connection 19. Alternatively, the bar code scanner 20 communicates with the wireless telephone 18 via infrared, laser, radio, or any other desired means.

Alternatively, a built-in bar code scanner 25 and/or a built-in IC card reader/writer 27 are formed integrally with the wireless telephone 18. In a store, a bar code on a purchased item 33 is scanned by bar code scanner 20 attached to a wireless telephone 18.

A catalog 21 of the items which can be purchased contains a bar code 22 for each such item, and preferably also contains descriptive text 13 and a picture 15 of each item. The use of such a catalog 21 or the like facilitates the purchasing of products via the electronic shopping system of the present invention when the purchaser is not in the store where the items are sold. Typically, each item 33 also has a bar code 31 applied thereto.

The store server 10, as well as any remote server 26, if used, stores the purchase transaction program which is to be downloaded into the wireless telephone 18 when a call is made from the wireless telephone 18 to the store server 10 or the remote server 26. The store server 10 and the remote server 26 also contain a program, i.e., the server personal shopping application (FIG. 2), which cooperates with the purchase transaction program downloaded to the wireless telephone 18 to effect purchase transactions, including the selection of items to be purchased and payment therefore, as discussed in detail below.

When the wireless telephone 18 is used within or close to the store where the store server is located, then the optional extension PBX 24 may be utilized to facilitate radio communication between the store server 10 and the wireless telephone 18, thereby eliminating the need for the cellular telephone network 17. By using an extension PBX 24, reliable communication between the store server 10 and the wireless telephone 18 is assured and costs associated with use of the cellular network 17 are avoided. Those skilled in the art will appreciate various other means of providing in-house radio communication between the wireless telephone 18 and the store server 10 are likewise suitable.

Figure 2:
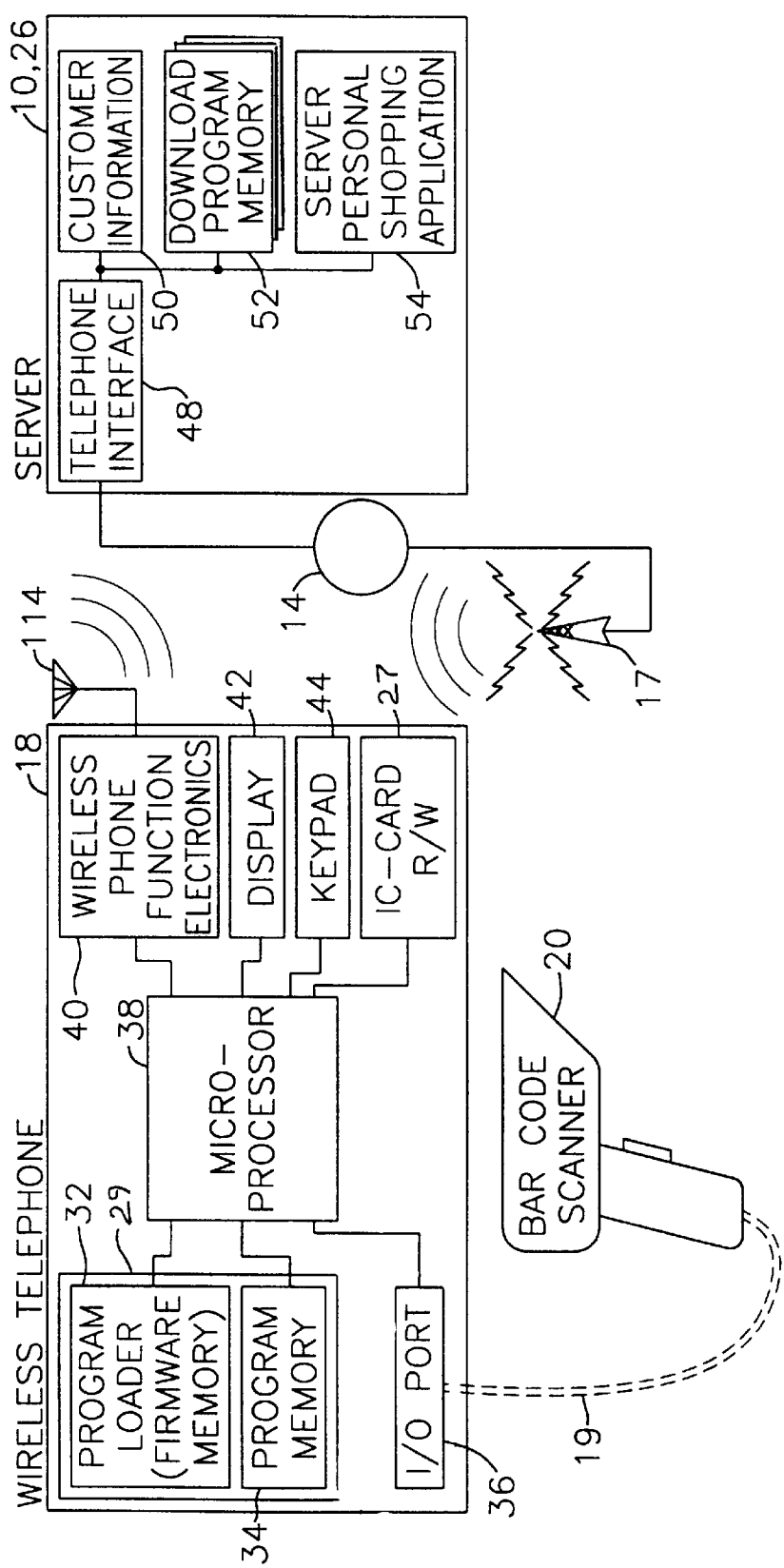
FIG. 2 is a block diagram showing the wireless telephone and a server in further detail.

In use, a purchaser merely dials the telephone number of the store server 10 or remote server 26 with the wireless telephone 18. Upon connection of the wireless telephone 18 to the store server 10 or the remote server 26, the purchase transaction program is downloaded from the store server 10 or the remote server 26 into the wireless telephone 18 under the direction of a program loader 32 (FIG. 2).

More particularly, the telephone interface of the store server 10 or remote server 26 facilitates receipt of the telephone call from the customer and downloading of the appropriate purchase transaction program to the wireless telephone 18. The server personal shopping application facilitates sending and receiving of information between the customer's wireless telephone 18 and the store server 10 or remote server 26. When the store server 10 or remote server 26 is called by the customer's wireless telephone 18, then the telephone interface obtains the customer's phone number and then searches the customer information database in the store server 10 or remote server 26 in order to obtain the following information: customer's telephone number, download program ID, customer ID, and customer name. This information is preferably stored in the store server 10 or remote server 26 when the customer enrolls in the personal shopping application. In this manner, the customer's telephone number provides a degree of validation, and thus serves to indicate that the customer is authorized to make purchases.

Based upon the download program ID, the appropriate download program is downloaded from the store server 10 or remote server 26 to the wireless telephone 18. The particular purchase transaction program (which has a unique ID) which is transmitted from the store server 10 or remote server 26 to the wireless telephone 18 is selected so as to be consistent with the purchaser's profile, e.g., telephone type, as well as the purchaser's personal preferences, such as language and particular interests.

The store server 10 or remote server 26 personal shopping application facilitates purchase transactions. Each message coming from a wireless telephone 18 is associated with the customer's telephone number, the customer ID, or some other unique identification. When the store server 10 or remote server 26 receives bar code data from the customer's wireless telephone 18, then the store server 10 or remote server 26 searches a database and obtains a description and price for the item scanned. The item description and price is then transmitted to the customer's wireless telephone 18 and is preferably displayed upon the display 42 thereof. All of the data received from the customer's wireless telephone 18, including data regarding returned items (those which the customer has decided not to purchase) are kept by the store server 10 or remote server 26 so as to facilitate a subsequent payment procedure.

Optionally, the store server 10 or remote server 26 also sends other information to the customer's wireless telephone 18. Such other information may comprise promotional information, discount information, a personal, etc.

After being downloaded, the purchase transaction program optionally requests that the purchaser enter a password. The use of such a password provides further validation of the customer. The use of such a password is particularly useful in preventing the use of a stolen wireless telephone 18 in the performance of unauthorized purchase transactions. The purchase transaction program may display instructions and/or provide voice guidance to the user for using the keypad to input the password. Voice recognition may be used to enter the password. Preferably, the download program, the server, or store personnel provide guidance for entering the password, as described below. The purchase transaction program may either verify the password or communicate the password to the server for verification. If the password is determined to be valid, then the customer is prompted to scan bar codes of items which are to be purchased. If the password is determined to be invalid, then the user is prompted to re-enter the password.

After the password is verified, the purchase transaction program facilitates use of the wireless telephone 18 to both select items to be purchased and pay for those items. Items are preferably selected for purchase by scanning bar codes 31 or 22 indicative of the item to be purchased via bar code scanner 20 which is connected to the wireless telephone 18 or via built-in bar code scanner 25. Alternatively, items to be purchased may be selected by entering a stock number, such as a Universal Product Code (UPC) code, via the telephone keypad.

After the desired items have been selected, payment therefor is preferably effected via a built-in IC card reader/writer 27.

When the wireless telephone 18 is used to make purchases within a store, bar codes on merchandise or bar codes on the store shelf where the product is displayed, upon the product to be purchased or within a catalog, may be scanned to facilitate selection of desired items to be purchased. When the wireless telephone 18 is used to make purchases while away from the store, then a catalog 21 or any other source of bar codes may be utilized.

As each bar code is read, the purchase transaction program sends bar code data, such as SKU (Stock Keeping Unit) code or the Universal Product Code represented thereby, to the server and the server then preferably responds by sending a description and price for the product back to the wireless telephone 18, where the information is preferably shown upon the display 42 thereof. Also, the total price of items selected for purchase is preferably displayed.

Referring now to FIG. 2, the wireless telephone 18 and a store or remote server 10, 26 are shown in further detail. It should be appreciated that the store server 10 is generally identical to the remote server 26. However, the remote server 26 is located away from the store.

The wireless telephone 18 comprises a microprocessor 38 in communication with wireless telephone function electronics 40, display 42, keypad 44, input/output port 36, and IC card reader/writer 27. The microprocessor 38, wireless telephone function electronics 40, display 42, keypad 44, input/output port 36, and IC-card reader/writer 27 are all typical components of a contemporary wireless telephone.

To such a contemporary wireless telephone is added an electronic shopping section 29, so as to facilitate the practice of the present invention. The electronic shopping section 29 comprises program loader 32 and program memory 34, all of which are in communication with microprocessor 38.

The input/output port 36 facilitates electrical communication between the microprocessor 38 and bar code scanner 20 via RS232C, USB, IEEE1394, irDA or any other suitable interface 19.

The microprocessor 38 may be any conventional microprocessor or digital signal processor suitable for use in contemporary wireless telephone applications. The wireless telephone function electronics 40 comprise the electronics associated with the functions of a contemporary wireless telephone, such as telephone number memory, dialing, connect and disconnect circuitry, digital encoding (if used), radio frequency modulation and demodulation, and power amplification. The display 42 is typically an LCD display which displays the number being dialed, as well as various other optional information such as battery charge level, signal strength, individual call time and total call time. The keypad 44 is used to enter numeric, and optionally alpha, character information. The IC-card reader/writer 27 is used to read and write to an integrated circuit (IC) card which contains user account information and may be used with a plurality of different compatible wireless telephones, generally so as to facilitate billing to a desired customer. Thus, a first person may use his or her personal IC-card in a second person's cellular telephone to assure that a call is billed to the first program.

The electronic shopping section 29 comprises some of those components of the present invention which are added to a contemporary wireless telephone so as to facilitate electronic shopping according to the present invention. More particularly, the program loader 32 comprises a firmware memory which stores instructions for facilitating the download of the purchase transaction program from the server 10, 26. Instructions stored in the firmware memory of the program loader 32 are executed by microprocessor 38 after a call has been placed from the wireless telephone 18 to the server 10, 26 as discussed in detail below.

The program loader 32 optionally also comprises any desired circuitry which facilitates or enhances downloading of the purchase transaction program. Indeed, the program loader may optionally comprise only active circuitry rather than memory, if so desired. Such active circuitry is configured to respond to connection of the wireless telephone 18 to the server 10, 26 by effecting automatic download of the purchase transaction program without requiring that instructions be read from a memory.

Optionally, the program loader 32 comprises instructions, drivers, and/or circuitry which facilitates or enhances portions of the selection and/or payment processes. For example, the program loader 32 optionally contains drivers for the scanner 20 and/or IC card reader/writer 27.

Program memory 34 contains the purchase transaction program after it has been downloaded. This purchase transaction program is used by the purchaser to make product selections and to pay for purchased products.

The firmware memory of the program loader 32 comprises a non-volatile memory because the instructions stored therein do not change often. Conversely, the program memory 34 preferably comprises a volatile memory, since the purchase transaction program stored therein is downloaded for each use thereof.

Optional input/output port 36 facilitates communication with optional bar code scanner 20, so as to allow a purchaser to make product selections by scanning contemporary UPC bar codes 22, 31 (FIG. 1) or the like. The bar codes may be scanned from a catalog, a shelf within a store, the product itself, or any other desired location.

Optional IC card reader/writer 27 facilitates payment for purchased products via the use of an IC card or the like.

The server 10, 26 comprises a telephone interface 48 which is in communication with a customer information database 50, at least one download program memory 52 and a server personal shopping application 54.

The telephone interface 48 of server 10, 26 facilitates communication of the server 10, 26 with a telephone network and preferably comprises a conventional modem. Alternatively, the telephone interface 48 may comprise a cable modem, a network card, or any other device which facilitates communication with a commercial telephone system.

The customer information database 50 contains information regarding each customer's authorization to participate in electronic shopping.

The customer information database preferably comprises the phone number, telephone type, password, customer ID, customer name, and any other desired customer profile information, as shown in FIG. 9. The customer profile information may also contain credit information, shipping addresses, product interests, and/or prior shopping history.

The server 10, 26 retrieves caller's telephone number information from the customer information database 50 so as to determine download program ID from the download program memory 52 which is tailored specifically to the telephone of the purchaser.

The purchase transaction program which is downloaded from the download program memory 52 of server 10,26 to a purchaser's wireless telephone 18 comprises instructions which facilitate the selection of products to be purchased and payment therefor. The purchase transaction program may either be identical for all purchasers or alternatively may be different for different individual purchasers or classes of purchasers, as desired.

When different purchase transaction programs are used for different customers, a download program ID may be associated with each different customer, in the customer information database (FIG. 9), so as to properly associate the desired download program with each customer.

It may be beneficial to provide different purchase transaction programs for different purchasers. For example, different purchase transaction programs may contain different languages, menus, options, methods for making selections, and/or methods for making payment for purchases. Further, different purchase transaction programs may optionally contain messages or advertisements of interest to particular purchasers. Thus, those purchasers who are interested in sports, for example, would receive news and/or advertisements related to sports activities.

The purchase transaction program may be written in any suitable programming language, such as Java, HTML or C++.

Since not all purchasers will necessarily have either a bar code scanner 20 or an IC card reader/writer 27, tailored purchase transaction programs may be provided to individual purchasers, so as to accommodate each individual purchaser's particular wireless telephone 18 and/or other electronic shopping devices, e.g., bar code scanner 20, IC card reader/writer 27. That is, if a particular purchaser does not have an IC card reader/writer 27, for example, then that portion of the purchase transaction program which facilitates operation of such an IC card reader/writer 27 may be omitted. Further, if the purchaser does not have an IC card reader/writer 27, and must therefore enter credit card information, i.e. account number and expiration date, via the keypad 44, then the purchase transaction program contains instructions for facilitating use of the keypad 44 to pay for the purchase of products. In this manner, the purchase transaction program is tailored to particular purchasers and the size of the purchase transaction program tends to be minimized by eliminating those portions of the program which are not to be used by a particular purchaser.

Alternatively, the purchase transaction program comprises instructions which facilitate all modes of operation of the wireless telephone 18 and any associated devices, e.g., bar code scanner 20, IC card reader/writer 27, etc. In this manner, a single, identical purchase transaction program is always downloaded to every purchaser, thereby simplifying the operation of server 10, 26. Of course, the disadvantage of such operation is that a larger purchase transaction program must be downloaded to the wireless telephone 18, thereby requiring more memory in the wireless telephone 18. The download of such a comprehensive purchase transaction program will also take longer.

Server personal shopping application 54 is a program which is stored at server 10, 26 and which facilitates operation of the server 10, 26 to perform electronic shopping. The server personal shopping application 54 facilitates the downloading of purchase transaction program to a wireless telephone 18 after the wireless telephone 18 has dialed server 10, 26 and established a connection therewith as discussed above. Server personal shopping application 54 also facilitates the receiving and processing of product selections made by a purchaser utilizing the wireless telephone 18 as discussed above. The server personal shopping application 54 also receives and stores payment information, such as credit card account numbers, expiration dates, etc. The server personal shopping application 54 also facilitates the reading and updating of information on a purchaser's IC card via IC card reader/writer 27, if utilized.

Optionally, server personal shopping application 54 performs billing functions, such as performing the necessary communications and transactions with credit card companies in order to facilitate the billing of purchasers by the credit card companies.

Figure 3:
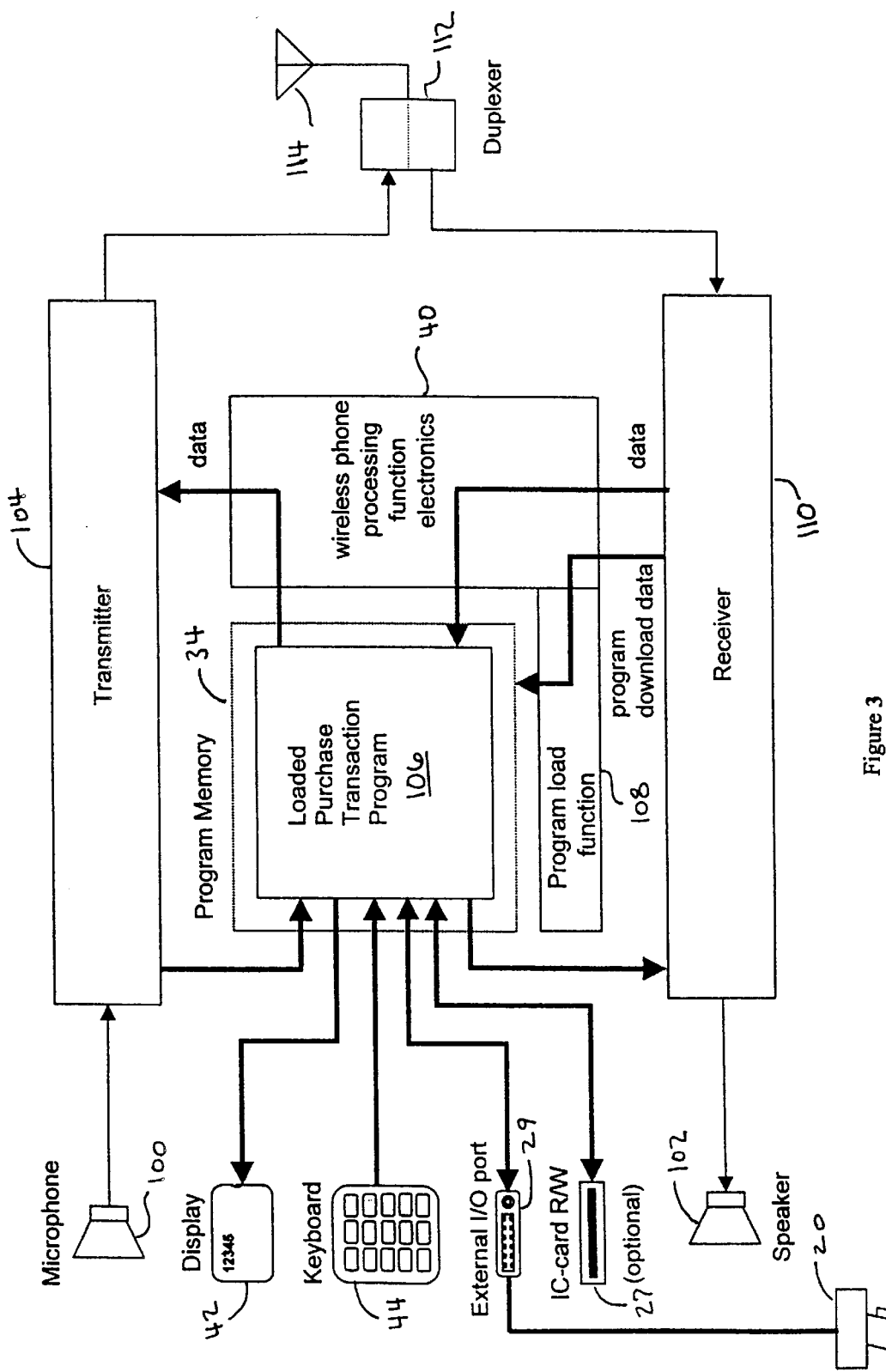
FIG. 3 is a functional block diagram of the wireless telephone of the present invention.
Figure 4:
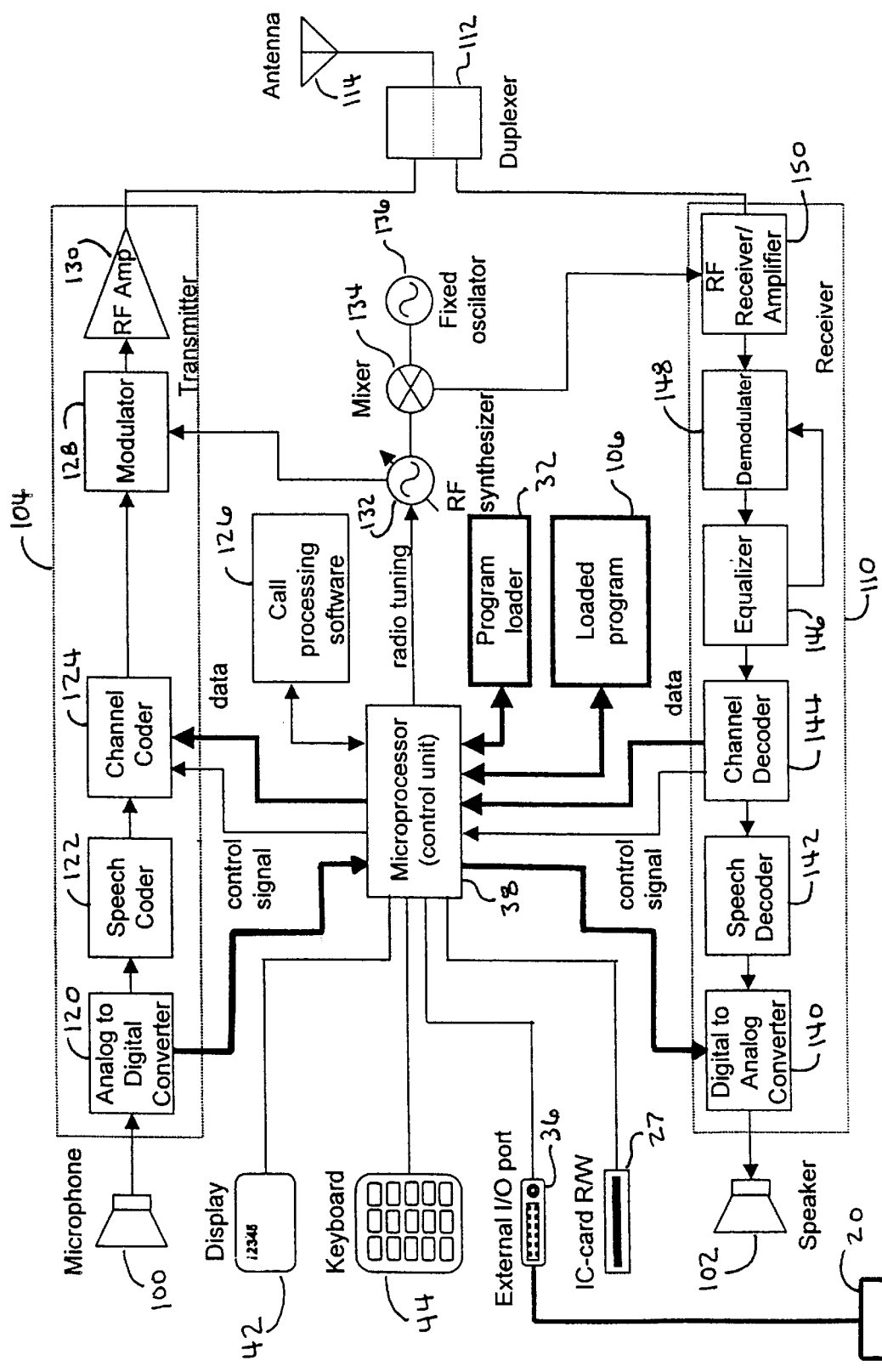
FIG. 4 is a block diagram of the wireless telephone of the present invention showing the interrelationship of the components of the present invention (shown with bold or heavy lines) with the components of a contemporary wireless telephone.

Referring now to FIG. 3, the receiver 110 of the wireless telephone 18 receives the purchase transaction program via the antenna 114 and the duplexer 112 and provides the purchase transaction program, according to the program load function 108 of the program loader 32 (FIG. 2) to program memory 34, where the loaded purchase transaction program 106 is stored so as to facilitate its execution via microprocessor 38 (FIGS. 2 and 4). Program load function 108 transfers control to the Loaded Purchase Transaction Program 106 upon completion of downloading. Then the Loaded Purchase Transaction Program 106 starts execution. During execution of the loaded purchase transaction program 106, the receiver 110 receives data from server 10, 26 (FIGS. 1 and 2) such as product descriptions and prices, and the transmitter 104 transmits information to the server 10, 26, such as Universal Product Codes and the quantity of each item ordered.

Optionally, the microphone 100 and the speaker 102 of the wireless telephone 18 may be utilized in a conventional manner to communicate with either a person or the server 10,26 (via voice recognition and synthesis), such that verbal inquiries of the purchaser may be addressed while simultaneously performing purchase transactions. Thus, the wireless telephone processing functional electronics 40 are preferably configured such that voice and data may be intermixed during the purchasing process, when the wireless telephone 18 is in communication with the server 10, 26. In this manner, store advertisements and announcements may also be transmitted as voice from the server 10, 26 to the wireless telephone 18.

Referring now to FIG. 4, the wireless telephone 18 comprises call processing software 126, RF synthesizer 132, mixer 134, fixed oscillator 136, duplexer 112 and antenna 114, which operate as in contemporary wireless telephones. A transmitter 104 comprises analog to digital converter 120, speech coder 122, channel coder 124, modulator 128, and radio frequency amplifier 130 which operate according to well known principles. Further, the receiver 110 comprises digital to analog converter 140, speech decoder 142, channel decoder 144, equalizer 146, demodulator 148, and radio frequency receiver/amplifier 150 which also operate according to well known principles.

The electronic shopping section (29 of FIG. 2) which is added to a contemporary wireless telephone comprises program loader 32, loaded program 106 (which is stored within the program memory 34 of FIG. 2), and bar code scanner 20 optimally connected to the wireless telephone 18 via external input/output port 36. The added components, along with the data paths therefor, are shown in bold in FIG. 4.

The data path from the channel decoder 144 to the microprocessor 38 accommodates the communication of data from the server 10, 26 to the microprocessor 38 of the wireless telephone 18, such as during purchase transaction program downloading and execution of the purchase transaction program. The data channel from the microprocessor 38 to the channel coder 124 facilitates the communication of data from the microprocessor 38 to the server 10, 26 during execution of the purchase transaction program 106.

The data path from the analog to digital converter 120 to the microprocessor 38 accommodates the communication of voice data from the microphone 100 to the loaded program 106, such as voice command, menu selection by voice and/or purchased item selection by voice. The downloaded purchase transaction program optionally has voice recognition capability and voice data is recognized properly by the purchase transaction program in parallel with input from keyboard 44 and external bar code scanner 20. The data channel from the microprocessor 38 to the digital analog converter 140 facilitates the communication of voice data from the loaded program 106 to the speaker 102, such as voice/sound guidance and error message by voice. The downloaded purchase transaction program provides voice message to purchaser through speaker of the wireless telephone in parallel with message displaying on the display of wireless telephone. Also, voice data between the wireless telephone and the server may be transferred by the microphone/transmitter and receiver/speaker in parallel with transfer of non voice data and processing of the downloaded purchase transaction program.

As in contemporary digital wireless telephone communications, each message slot consists of both control signals and data. Control signals are used for transmission/reception control. According to contemporary practice, data is the digitized voice message transmitted by a person speaking over the wireless telephone 18. However, according to the practice of the present invention, such data comprises digital information representative of purchase selections, prices, quantities selected, etc., as well as optional voice data.

Thus, according to the present invention, the antenna 114 receives a radio frequency signal which comprises the purchase transaction program. The radio frequency receiver/amplifier 150 is coupled to receive the radio frequency signal from the antenna 114 and amplifies the radio frequency signal. The demodulator 148 is coupled to receive the amplified radio frequency signal from the radio frequency receiver/amplifier 150 and demodulates the amplified radio frequency signal. The equalizer 146 is coupled to receive the demodulated signal from the demodulator 148 and equalizes the demodulated signal so as to mitigate distortion thereof according to well known principles. The channel decoder 144 is coupled to receive the equalized signal from the equalizer 146 and separates non-speech digital data from the equalized signal. Thus, the channel decoder 144 separates the purchase transaction program from the equalized signal and communicates the purchase transaction program to the program memory 34 under the direction of the program loader 32.

Referring now to FIGS. 5–8, operation of the electronic shopping system of the present invention is discussed in detail.

Figure 5:
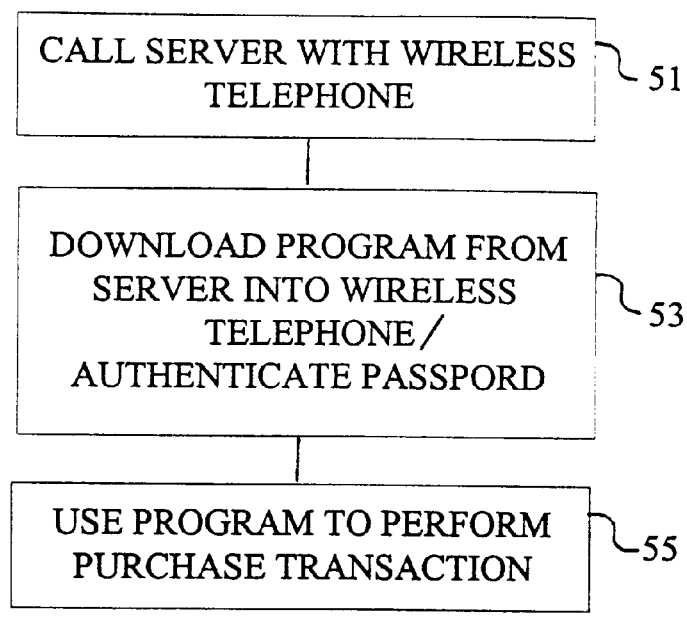
FIG. 5 is a flow chart showing operation of the electronic shopping system of the present invention.

With particular reference to FIG. 5, operation of the electronic shopping system of the present invention generally comprises calling 51 a server 10, 26 with a wireless telephone 18 so as to initiate communication between the wireless telephone 18 and the server 10, 26.

In making such a call, the purchaser merely dials the number of the server 10, 26 for the company from which the purchaser would like to make a purchase. The purchaser is typically unaware whether a store server 10 or a remote server 26 is being called. All operations performed by the purchaser are identical whether a store server 10 or a remote server 26 is called by the purchaser.

Once connection between the wireless telephone and the server is established, then a purchase transaction program is downloaded 53 from the server into the wireless telephone 18. The password is preferably authenticated by the downloaded purchase transaction program. Then, the purchase transaction program is used 55 to perform the desired purchase transactions.

Figure 6:
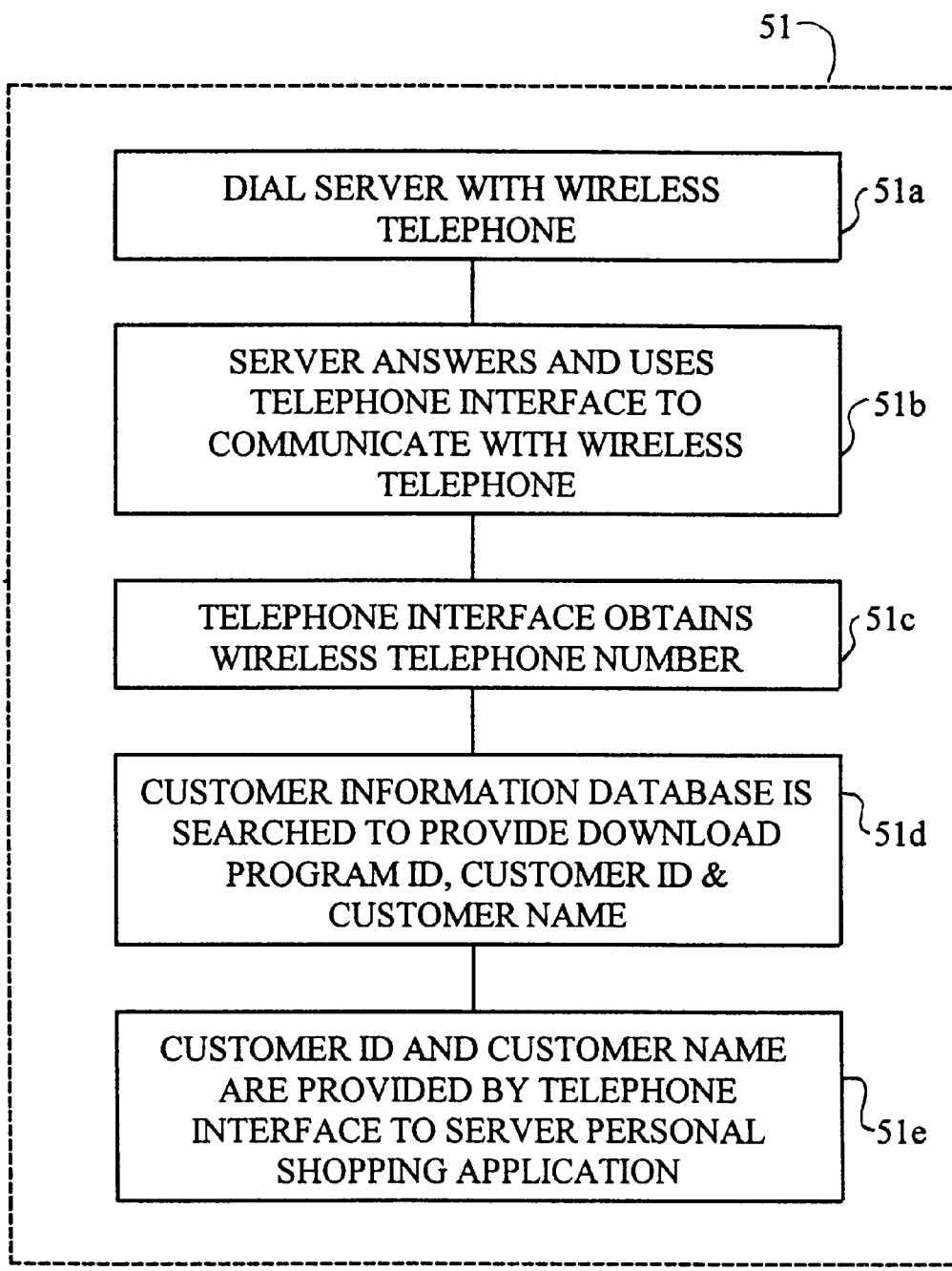
FIG. 6 is a flow chart showing the step of calling the server with the wireless telephone according to FIG. 5, in further detail.

With particular reference to FIG. 6, the step of calling 51 the server 10,26 with the wireless telephone 18 comprises the steps of dialing 51a the server 10,26 with the wireless telephone, the server 10,26 answering 51b and using the telephone interface to communicate with the wireless telephone, the telephone interface obtaining 51c the wireless telephone's number, and the customer information database being searched 51d to provide the customer's telephone type, customer ID, and customer name. The customer ID and customer name are provided 51e by the telephone interface to the server 10,26 personal shopping application.

Guidance may be provided to the user for manually entering an authorization number, password or the like via the keypad 44 using the display 42 of the telephone or alternatively, via voice instruction. This guidance is preferably provided by the loaded purchase transaction program 106. Alternatively, such guidance may be provided by the server 10, 26 or by store personnel who respond to either voice queries or keyboard entries. The password may be of any desired length.

According to the preferred embodiment of the present invention, two different checks are performed by the server 10, 26 to verify that the customer is an authorized customer. First, the telephone number of the wireless telephone 18 is checked to verify that the wireless telephone 18 is in the customer database and that the owner of the wireless telephone 18 is authorized to make purchase transactions. The customer's telephone number is preferably preregistered, and thus is present in the customer database, if the customer is a valid customer. Verification of the customer telephone number inhibits the making of unauthorized purchase transactions by people other than the authorized customer, e.g., by someone who is using a different wireless telephone.

After downloading of the purchase transaction program to the wireless telephone 18, then the customer may additionally be required to enter the authorization number or the password as discussed above. Both the telephone number and the password entered by the customer must be valid before purchase transactions are permitted. By requiring such an authorization number or password, the making of unauthorized purchase transactions by unauthorized persons using a stolen telephone is very effectively inhibited.

According to the preferred embodiment of the present invention, password authentication is performed by the downloaded purchase transaction program. Alternatively, password authentication is performed by the IC card or by the server 10, 26. Using the downloaded purchase transaction program to perform such password authentication provides desired flexibility and efficiency as compared with password authentication which is performed solely by the server 10, 26 or the wireless telephone 18, without use of the downloaded purchase transaction program. For example, the downloaded purchase transaction program may be configured so as to provide desired assistance in the entering of the password, such as providing instructions for doing so.

The call is made by dialing 51*a* the server's telephone number in a conventional manner. However the wireless telephone 18 may be placed in a program download mode prior to dialing the server's telephone number by either depressing a dedicated button upon the wireless telephone 18 or by entering a preselected code via the keypad 44 thereof. Alternatively, the wireless telephone 18 automatically begins downloading the purchase transaction program from the server 10, 26 upon connection. Such automatic downloading may be facilitated via a control signal, a code and/or header provided by the server 10, 26 which is recognized by channel decoder 144 and microprocessor 38 of the wireless telephone 18, so as to cause the wireless telephone 18 to receive and store the downloaded purchase transaction program according to instructions stored in the firmware memory of the program loader 32.

When a program load is initiated, the newly received purchase transaction program overwrites any previously received purchase transaction program stored in the program memory 34.

When the program load is completed, the program loader 32 transfers control to the loaded purchase transaction program (106 of FIG. 3). When the loaded purchase transaction 106 program initiates execution, the purchase transaction program assumes control over input/output ports 36, keyboard 44, microphone 100 and/or attached devices, e.g., a bar code scanner 20 and/or an IC card reader/writer 27. The purchase transaction program 106 also assumes control over all transmit/receive functions of the wireless telephone. According to the preferred embodiment of the present invention, program data and voice data are combined so as to facilitate the ability to make voice inquiries while the purchase transaction program is being executed.

Figure 7:
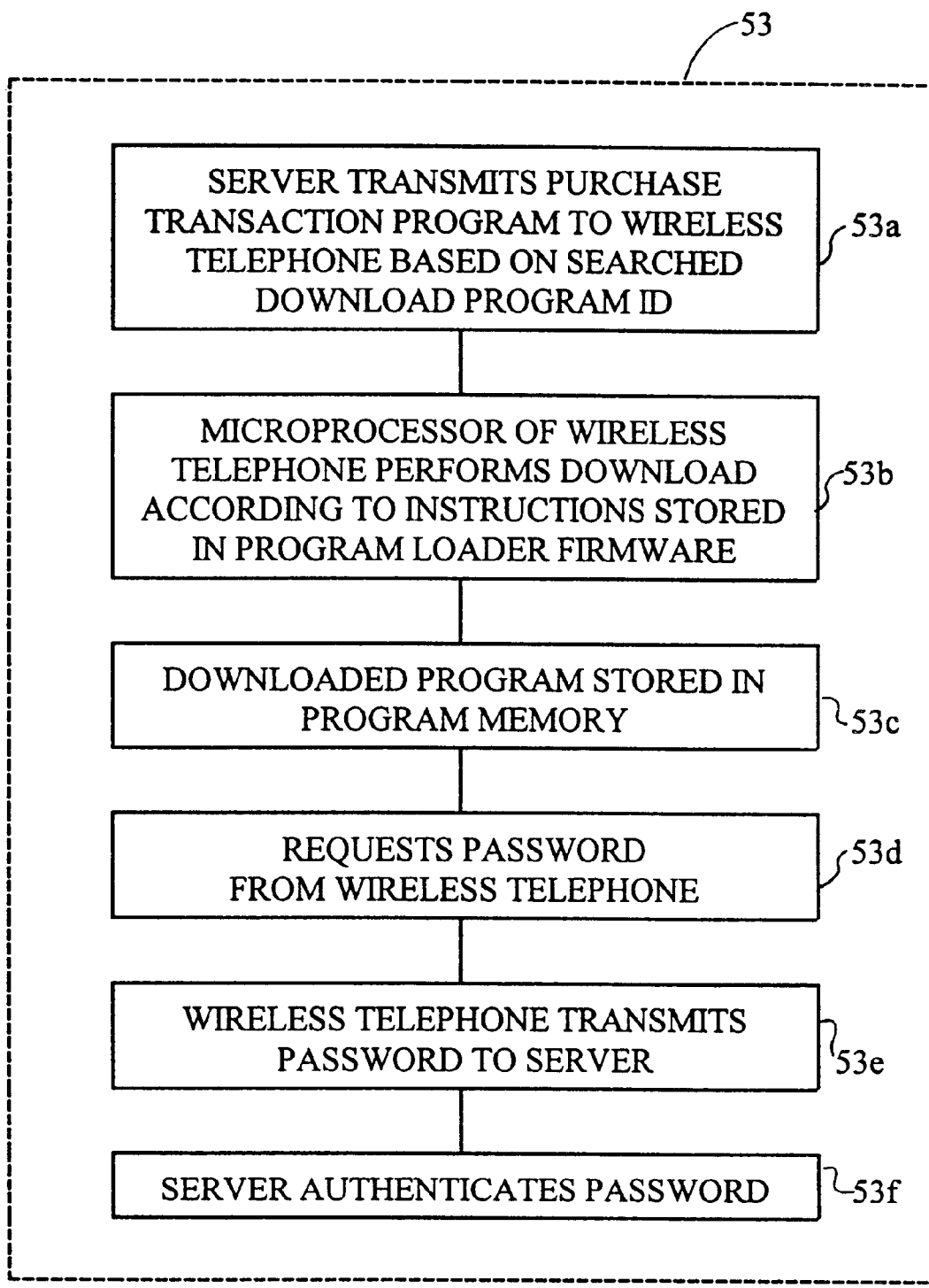
FIG. 7 is a flow chart showing the step of downloading the program from the server into the wireless telephone according to FIG. 5, in further detail.

With particular reference to FIG. 7, the process of downloading 53 a program from the server 10,26 into the wireless telephone comprises the steps of the server 10,26 transmitting 53*a* the desired purchase transaction program (which was selected based upon the user's telephone number) to the wireless telephone in 18. The microprocessor of the wireless telephone 18 performs the download 53*b* of the purchase transaction program according to instructions stored in the program loader firmware. The downloaded purchase transaction program is stored 53*c* in the program memory. Then the downloaded purchasing transaction program requests 53*d* a password from the wireless telephone 18. The downloaded purchase transaction program preferably provides guidance for password entry and also provides authentication. Alternatively, the wireless telephone 18 transmits 53*e* the password to the server 10,26, and the server 10,26 authenticates 53*f* the password.

Figure 8:
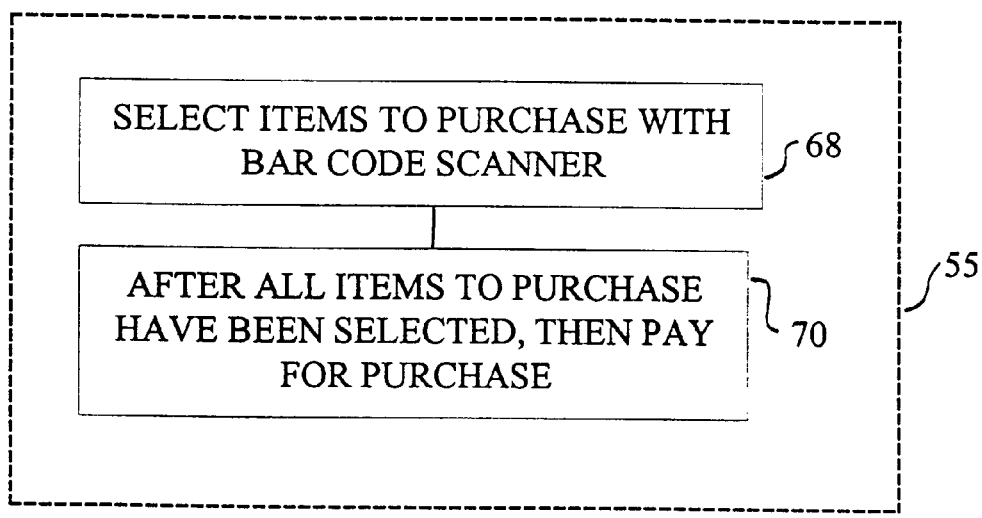
FIG. 8 is a flow chart showing the step of using the program to perform a purchase transaction according to FIG. 5, in further detail.

With particular reference to FIG. 8, once the purchase transaction program has been downloaded and stored in the program memory 34 of the wireless telephone 18, then a purchaser may select 68 items to be purchased. According to the preferred embodiment of the present invention, such selection 68 is effected by scanning UPC bar codes or the like with a bar code scanner 20. Those skilled in the art will appreciate various other codes, indicia, text, etc., may be scanned with various different scanning devices so as to facilitate the selection of items to be purchased. Further, those skilled in the art will appreciate that various other scanning technologies (different from UPC bar code scanning), such as electronic, magnetic, and optical technologies may be utilized to facilitate a product selection. For example, a magnetic tag or an electronic transponder may be placed upon the product, shelf, or within a catalog and may similarly be scanned to effect product selection.

Alternatively, product selections may be made by manually entering a UPC code, stock code or the like into the wireless telephone 18 via the keypad 44 thereof.

According to the preferred embodiment of the present invention, after each product is selected, a description of the product and the price thereof is shown in the display 42 of the wireless telephone 18. This information may comprise part of the purchase transaction program, or alternatively may be communicated from the server 10, 26.

According to the preferred embodiment of the present invention, the purchaser is given an opportunity to either confirm a purchase or to delete the item from the purchase list after each selection is made. The purchaser is preferably also given a choice to confirm or delete each purchase selection once all purchase selections have been made, prior to paying for the purchases.

According to the preferred embodiment of the present invention, the purchaser indicates that all desired purchases have been made by pressing a predetermined key of the keypad 44. The wireless telephone 18 then responds by displaying the total price of all purchases and also preferably provides an opportunity to delete purchases from the list as discussed above.

After all the items to be purchased have been selected 68, then the purchaser preferably pays 70 for the purchases with an IC card, credit card, check card, or the like. Alternatively, the purchaser may manually enter a credit card account number and expiration date or the like into the wireless telephone 18 via keypad 44.

Optionally, a customer may pre-register a credit card with the seller, such that purchases are automatically applied to the credit card account, thereby eliminating the need to enter credit card information or use an IC card or the like to effect payment for the purchased products.

When shopping is completed within a store, then payment may either be effected via the wireless telephone 18, as described above, or alternatively may be performed at the check out counter of the store. When payment is performed at the check out counter of the store, the information stored in the wireless telephone and/or the server 10,26 regarding purchases which have been made may be utilized to conveniently facilitate such payment by eliminating the need for a check out clerk to individually enter purchases.

Alternatively, when used in a store, the purchaser may check out by simply scanning a bar code at the check out counter. The scanned bar code indicates to the server 10, 26 the particular check out counter where the purchaser is located. A list of the purchased items and their prices is then transmitted from the server to the check out counter where the purchaser is located and the purchaser pays a check out clerk for the purchased items in the desired manner, e.g., cash, check, credit card, IC card, etc.

When shopping in a store which utilizes a remote server 26, a purchaser may scan a bar code which indicates to the remote server 26 the store where the purchaser is shopping. This bar code may be displayed, for example, upon a shopping cart. The store location information is then used for inventory management of the purchased items at the store where the items are purchased.

When an IC card reader/writer 27 is utilized, then an electronic receipt for the products purchased may be stored in the IC card, if desired. The stored electronic receipts within the IC card may later be used to communicate personal financial information to a purchaser's home computer, so as to facilitate desired record keeping. If desired, a shopping history for the purchaser may be maintained within the IC card. As those skilled in the art will appreciate, the use of such an IC card further facilitates dual direction authentication, wherein authentication is provided both for customer validation and for server validation.

Optionally, an IC card may additionally be utilized to maintain customer profile data, which may be accessed by the server 10, 26, if desired.

The electronic shopping system of the present invention can be used to sell a variety of products and services. It may be implemented to facilitate transactions at either a wholesale or retail level. Indeed, the present invention may be utilized to perform a variety of different types of transactions, other than purchase transactions.

Referring now to FIG. 9, a customer information table is shown. The customer information table is stored as a database by the server and is accessed by the telephone interface 48 and the server personal shopping application 54. According to the preferred embodiment of the present invention, the customer information table stores phone numbers, telephone types, download program identification numbers, passwords, customer identification numbers, customer names, and any other desired customer profile information.

In a second embodiment to the present invention, an exemplary electronic shopping system is implemented using a wireless videophone in place of the wireless telephone and bar code scanner combination of the first embodiment. The wireless videophone supports all of the same functions described in connection with the wireless telephone, above, and also is able to provide additional functionality which is not realizable with the preceding system. Briefly, the wireless videophone would become a commodity item that is eminently suitable for use as both a communication device and as an integral electronic shopping terminal, without the need for specialized, purpose-built apparatus.

Figure 10:
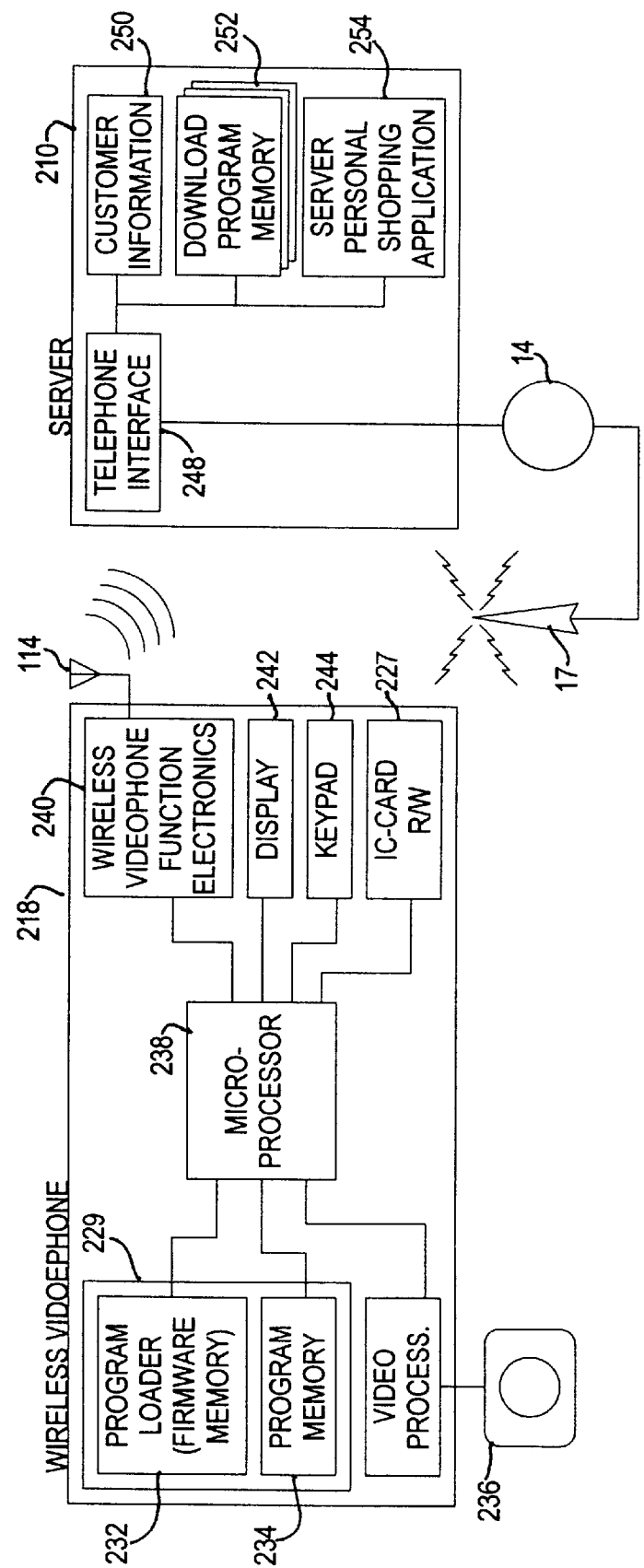
FIG. 10 is a block diagram depicting a wireless videophone embodiment of the electronic shopping system according to the invention.

Referring now to FIG. 10, a wireless videophone 218 in combination with a store or remote server 210 bears a striking similarity to the first embodiment of the present invention as shown in FIG. 2. As was the case with the first embodiment, it will be appreciated that the server 210 is referred to generally as a store server, but might indeed be a remote server, platform computer, or the like, and may be situated either in the store or in an outside location.

The wireless videophone 218 suitably includes a microprocessor 238 in communication with wireless videophone function electronics 240, a graphics display 242, a keypad 244, an IC card reader/writer device 227 and a miniature, digital image capture device 236, such as a CCD camera system. A microprocessor 238, display 242, keypad 244, and IC card reader/writer unit 227 are all typical components of a contemporary wireless telephone system. In addition, wireless videophone function electronics 240 includes the wireless telephone functional electronics (40 of FIG. 2) required to operate the wireless videophone 218 as a communication device. In addition, the digital camera 236 includes processing circuitry which translates the visual image acquired by the camera's lens into digital signals suitable for processing by the microprocessor 238 into a form which can be broadcast transmitted (i.e., JPEG encoded, gif encoded, and the like) by the functional electronic section 240.

In a manner similar to that described, above, in connection with FIG. 2, an electronic shopping section 229 is added to the contemporary sections of the wireless videophone 218 in order to facilitate practice of principles of the invention. The electronic shopping section 229 suitably includes program loader circuitry 232 and a program memory store 234, both of which are in electronic communication with the microprocessor 238. The microprocessor 238 may be any one of a number of conventional microprocessor or digital signal processor circuits suitable for use in wireless telephone or wireless videophone applications. The wireless videophone function electronics 240 typically include the electronics associated with the functions of a contemporary wireless telephone, such as telephone number memory, dialing, connect and disconnect circuitry, digital encoding, power amplification and the like. In addition, the wireless videophone function electronics includes digital broadband RF modulation and demodulation circuitry suitable for transmitting and receive videographic data as well as conventional voice data.

Figure 14:
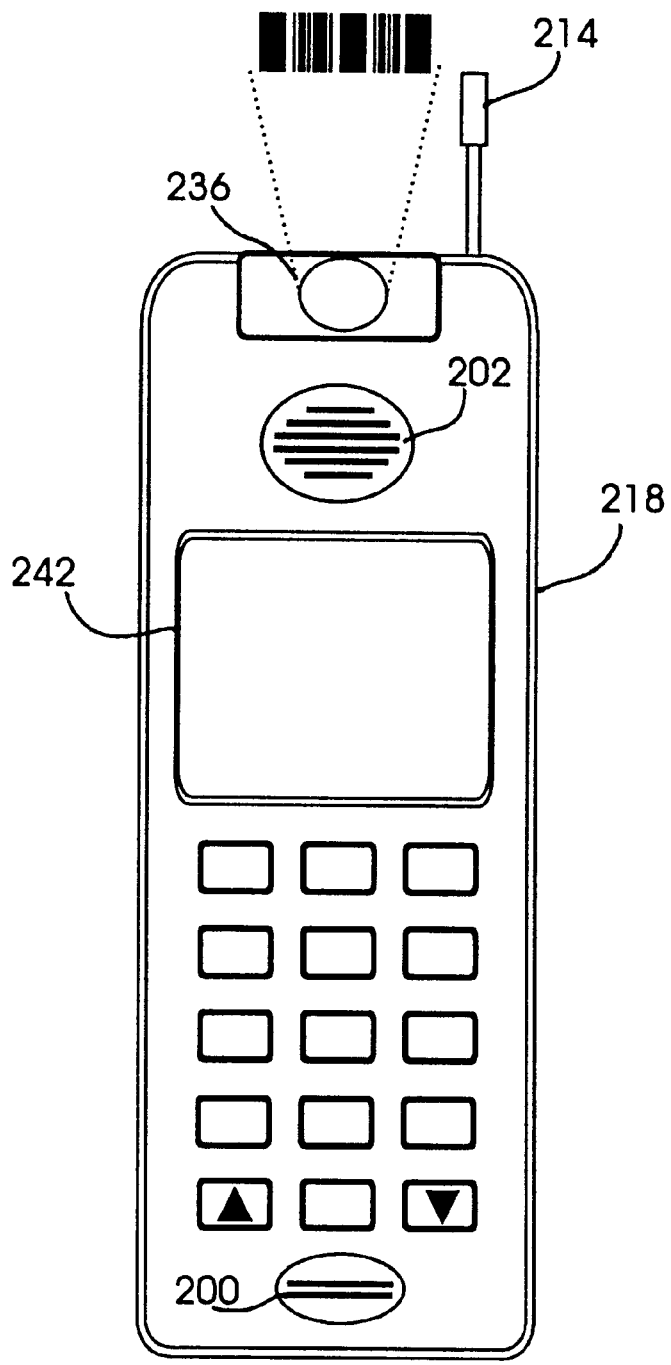
FIG. 14 is a semi-schematic representation of a wireless videophone in accord with practice of principles of the invention.

Turning briefly to FIG. 14, a wireless videophone 218 is depicted as having a similar footprint to a conventional wireless telephone unit. The videophone 218 suitably incorporates a microphone 200, a speaker 202, a keypad 244 (a term which is used interchangeably with keyboard), a graphics display 242, an antenna 214, and a digital camera 236, rotatably mounted on the front edge of the videophone 218.

The graphics display 242 is suitably implemented as either a color or black and white LCD display having a resolution of, for example, 320×240 pels. The graphics display 242 is capable of displaying conventional wireless telephone messages such as the number being dialed and the like, as well as displaying the image captured by the system's integral digital camera 236.

In so far as the digital camera 236 is concerned, the camera is most practically implemented as a black-and-white, or color capable, digital still camera system. It should be understood that bandwidth concerns govern the amount of visual image data being transmitted and/or received by the system. A simple, and inexpensive, implementation of the system would be one in which visual image data is captured on a frame-by-frame basis, at the direction of a user, in a manner similar to common digital cameras. It should be further understood that, if desired, the camera 236 and its associated electronics could be implemented as a reduced-frame-rate, motion capable, video camera, were the coding and decoding systems adjusted accordingly (i.e., MPEG or MPEG2 coding rather than JPEG or gif).

No matter how implemented, the camera 236 is mounted on a front edge of the videophone hand unit, in a rotatable frame, such that the image capture field can be rotated through approximately 180 degrees. This feature allows the camera lens to be positioned for more efficient image capture, while allowing the hand unit to be comfortably grasped.

Returning to FIG. 10, the IC card reader/writer 227 is used to read from and write to an IC card which might contain user account information and which may also be used to facilitate billing. The keypad 244 is used to enter numeric, and optionally alpha character information to the microprocessor 238 in conventional fashion.

The electronic shopping system 229 includes further components of the present invention so as to facilitate electronic shopping. More particularly, the program loader section 232 comprises a firmware memory which stores instructions for facilitating the download of purchase transaction programs, for example, from the system server 210. Instructions stored in the firmware memory of the program loader 232 are executed by microprocessor 238 after a call has been placed from the wireless videophone 218 to the server 210, as discussed in detail below.

The program loader 232 additionally includes any desired optional circuitry which facilitates or enhances downloading of a purchase transaction program. As was the case with the first embodiment, the program loader may comprise only active circuitry rather than memory, if so desired. Such active circuitry is configured to respond to connection of a wireless videophone 218 to the server 210 by effecting automatic download of the purchase transaction program without requiring that instructions be read from the memory.

The server 210 includes a telephone interface 248 which is in communication with a customer information database 250, at least one download program memory 252 and a server personal shopping application 254. The telephone interface 248 of the server 210 facilitates communication between the server and a telephone network and suitably includes a digital, broadband modem, a cable modem, a network interface card (NIC), or any other device which facilitates communication with a commercial broadband telephone system.

As was the case in the previous embodiment, the customer information database 250 contains information regarding each customer's authorization to participate in a particular electronic shopping application, and suitably includes a customer's phone number, the communication device type, i.e., telephone or videophone, download program ID, password, customer ID, customer name, and any other desired customer profile information as indicated generally in FIG. 9. The customer profile information may also include credit information, shipping addresses, product interests, and/or prior shopping history information.

In operation, when the server system 210 receives a customer access request, it retrieves the caller's profile information from the customer information database 250 so as to determine the appropriate download program ID corresponding to the download program memory 252, the program being tailored specifically to the communication device (telephone or videophone) of the purchaser. Purchase transaction programs which are downloaded from the download program memory 252 of the server to a purchaser's wireless videophone 218 comprises a characteristic instruction set which facilitates the selection of products to be purchased and the method of payment. A purchase transaction program, specifically, may either be identical for all purchasers or alternatively, may be different for different individual purchasers or classes of purchasers, as desired. When different purchase transaction programs are used for different customers, a download program ID may be associated with each different customer, in the customer information database so as to properly associate the desired download program with each customer. For example, different purchase transaction programs may be configured to display information in different languages, provide tailored menus, options and/or methods for making selections, and/or provide different methods for making payment for purchase transactions. Further, different purchase transaction programs may optionally contain messages or advertisements of particular interest to particular purchasers, with the messages or advertisements of interest being transmitted to a customer's videophone and displayed on the integral digital display 242.

For those purchasers who are equipped with a wireless videophone in accordance with the present invention, a tailored purchase transaction program is provided which accommodates the enhanced functional capabilities of the device. In particular, since the wireless videophone 218 is provided with a digital camera 236 in place of a bar code scanner, the tailored purchase transaction program might additionally include character recognition and/or pattern recognition, as well as bar code decode, software which would allow the wireless videophone to function in a manner similar to the wireless telephone and bar code scanner embodiment described above.

It should also be understood that the character recognition, pattern recognition and/or bar code decode routines need not be directly downloaded by the program loader firmware memory of the wireless videophone in order that the system have this particular capability. The wireless videophone is perfectly capable of capturing digital videographic information, such as a bar code pattern or a graphics image pattern, and transferring this information directly to the store's server through the functional electronics section. Once this information is received by the server, a character recognition and/or pattern recognition application routine can be invoked within the server in order to either decode the bar code videographic data or to perform pattern recognition functions on a icon-like patter captured by the digital video camera.

A server personal shopping application 254 is also resident in the server system 210 and might be characterized as a program for facilitating operation of the server in order to perform electronic shopping. The server personal shopping application 254 facilitates the downloading of the purchase transaction program and/or any appropriate character or pattern recognition routines to the wireless videophone 218 after the wireless videophone has established a connection with the server as discussed above. Server personal shopping application 254 also facilitates the reception and processing-of product selections made by a purchaser utilizing the wireless videophone as discussed previously as well as optionally facilitating the reception and decoding of bar codes, character or pattern information by an optional character and/or pattern recognition software routine. The server personal shopping application 254 is also adapted to receive and store payment information, such as credit card account numbers, expiration dates, and the like and is also capable of facilitating reading and updating of information on a purchaser's IC card via the IC card reader/writer 227, if utilized.

Figure 11:
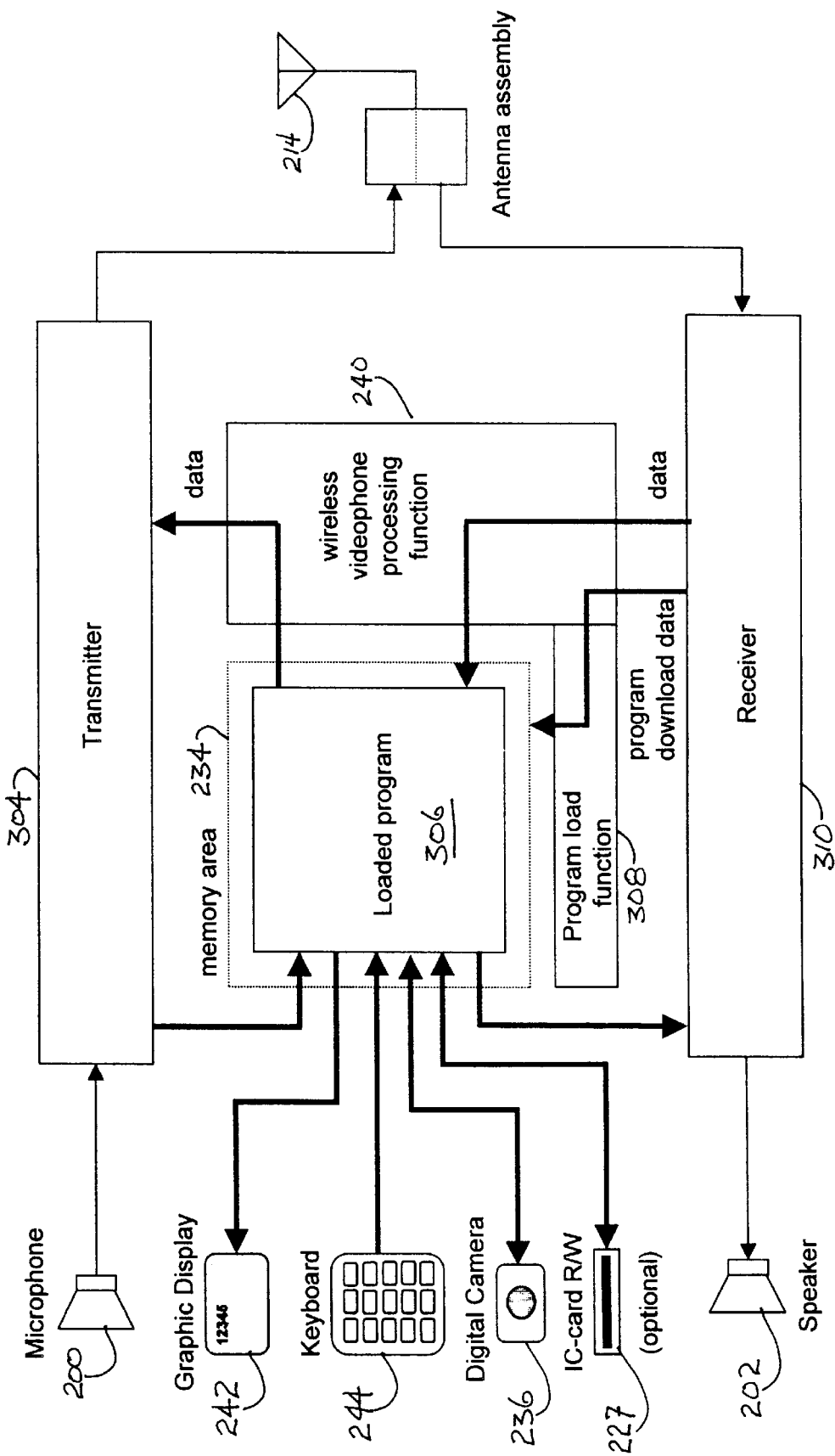
FIG. 11 is a functional block diagram of a wireless videophone according to the present invention.

Referring now to FIG. 11, receiver circuitry 310 of the wireless videophone 218 receives the purchase transaction program and optionally, the pattern or character recognition routine, via an antenna assembly 214 and provides the downloaded program to the program memory of the program loader through processing circuitry 240 in combination with program load function circuitry 308. Once the program is provided to program memory, the loaded purchase transaction program is stored so as to facilitate its execution via microprocessor 238. Program load function circuitry 308 transfers control to the loaded purchase transaction program 306 upon completion of downloading. Next, the loaded purchase transaction program 306 begins execution, during which the receiver circuitry 310 receives data from the store server such as product descriptions, prices, and the like and provides information to the server through transmitter circuitry 304. The information provided to the server through transmitter circuitry 304 includes information entered by means of the keypad 244 as well as videographic data captured by the system's digital camera 236 such as bar code data, icon-like product-specific patterns, and the like.

Optionally, a microphone 200 and speaker 202 of the wireless videophone 218 might be utilized in a conventional manner to communicate with either a person or the server (via voice recognition and synthesis), such that verbal inquiries of the purchaser may be addressed while simultaneously performing purchase transactions. In addition to supporting voice and/or alpha numeric interactive information exchange, the wireless videophone 218 is also eminently suitable for facilitating 2-way videographic communication between a purchaser and a retail outlet or store. Thus, the wireless videophone processing function electronics 240 are preferably configured such that voice information, video information and data may be intermixed during purchase process, when the wireless videophone 218 is in communication with the server. In this manner, store advertisements and announcements may also be transmitted as either voice or video from the server to the wireless videophone 218.

Figure 12:
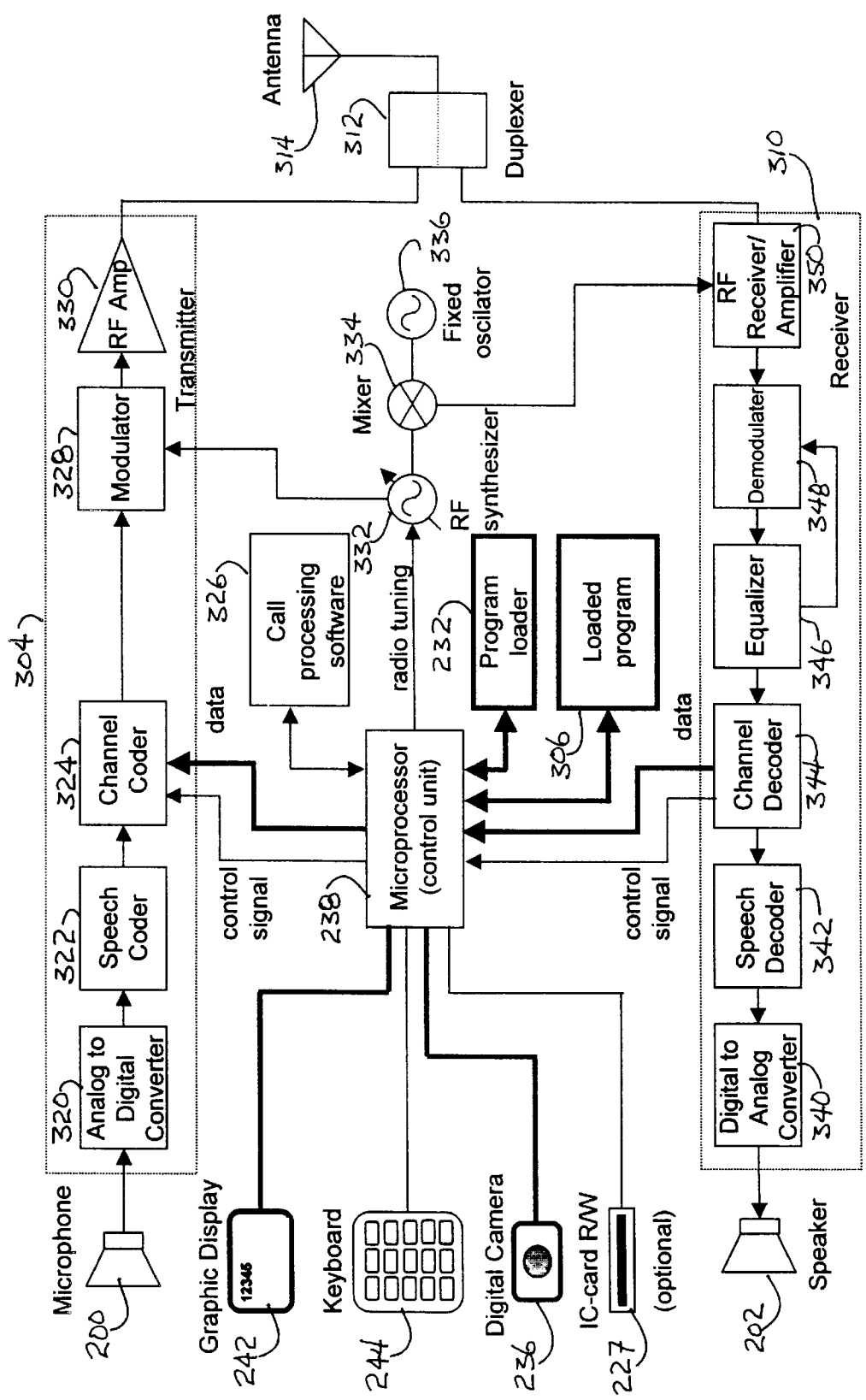
FIG. 12 is a block diagram of the wireless videophone of the present invention depicting the inner relationship of the components of the present invention (shown with bold or heavy lines) with the components of a contemporary wireless telephone system.

Referring now to FIG. 12, the wireless videophone 218 comprises call processing software 326, RF synthesizer 332, a mixer 334, a fixed oscillator 336, an antenna assembly including a duplexer 312 and antenna system 314 which, together function as a contemporary wireless telephone system. A transmitter 304 comprises analog to digital converter circuitry 320, a speech coder 322, a channel encoder 324, a broadband digital modulator 328 and an RF amplifier 330 which operate according to well known principles. Further, the receiver circuitry 310 comprises a digital to analog converter circuit 340, an speech decoder 342, a channel decoder 344, a digital equalizer 346 and digital demodulator 348 which, in combination with an RF receiver/amplifier 350 also operate in accordance with well known broadband broadcast receiver characteristics.

In accordance with practice of principles of the invention, videographic image data is received by the system's digital camera 236 and provided to the system's microprocessor 238 where the received videographic information is processed by an application program previously downloaded to the wireless videophone and stored as a loaded program 306. Following processing, the videographic image data is encoded by the channel encoded circuitry 324 for modulation and transmission to a store server. Optionally, if character or pattern recognition software has not been downloaded into the system, videographic image data is received by the microprocessor 238 and passed directly to the channel encoder circuitry 324 for modulation and broadcast by he system.

During receipt of videographic image data, once the digital videographic data has been demodulated and equalized by the demodulator and equalizer circuitry 348 and 346 respectively, the videographic image information is decoded by channel decoder circuitry 344 and directed to the microprocessor 238 for display on the graphic display screen 242. Optionally, the analog to digital converter 320 comprising the transmitter circuitry 304 might be directly coupled to the microprocessor 238, as might the digital to analog converter circuitry 340 comprising the receiver section 310, in order to facilitate voice recognition and synthesis capabilities that might be downloaded by the system from a store server. A data channel from the microprocessor 238 to the digital to analog converter 340 facilitates communication of voice data or synthesis of voice data to a speaker 302. Similarly, a data channel from the microprocessor 238 to the analog to digital converter 320 facilitates speech recognition of voice data received from the microphone 300. Additionally, audio data communicated between the wireless videophone and a store server may be transferred by the microphone/transmitter and receiver/speaker in parallel with the bi-directional transfer of alpha numeric and video graphic data as well as processing of the downloaded purchase transaction program.

Figure 13:
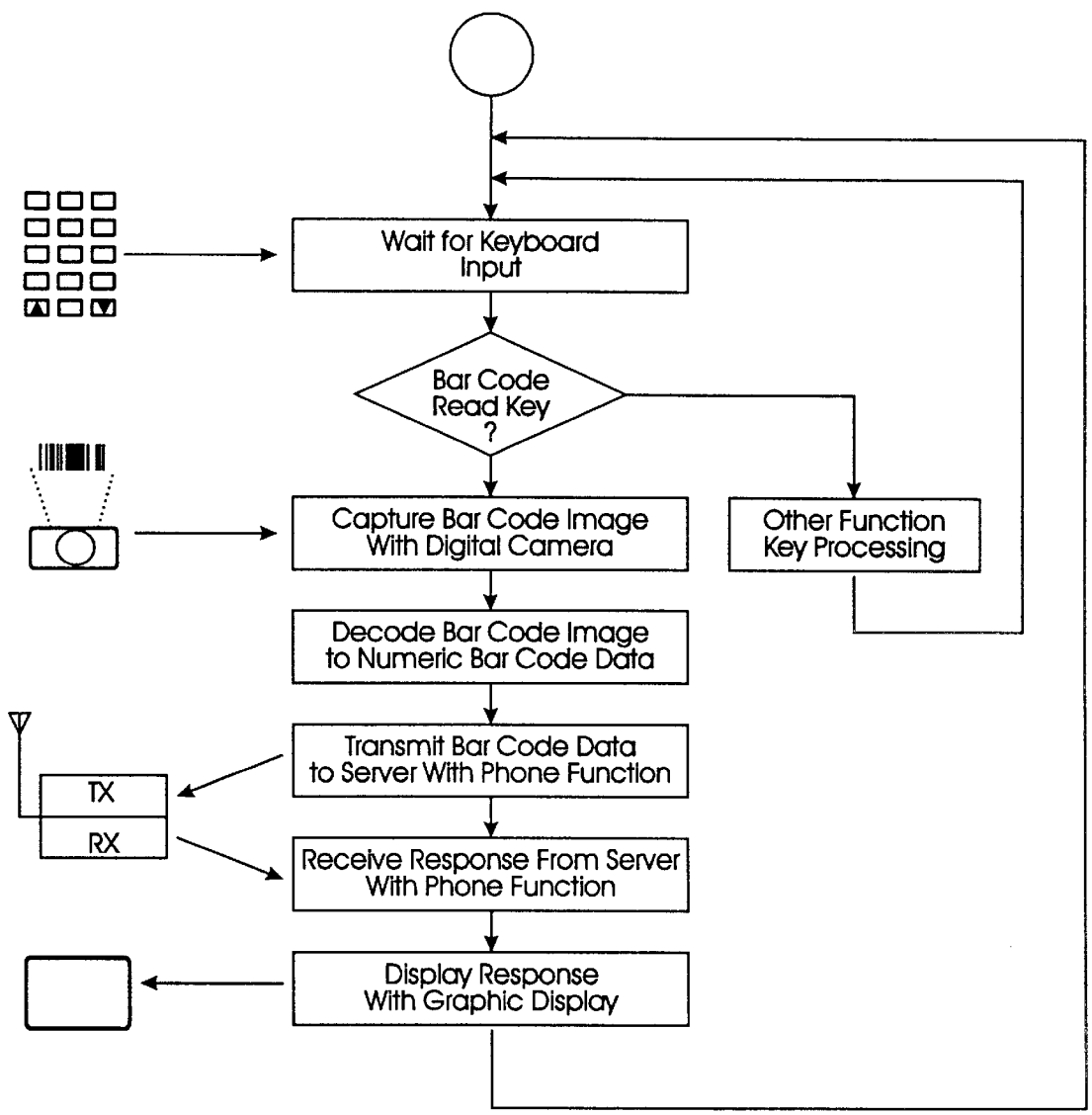
FIG. 13 is a flow chart depicting the steps associated with using a downloaded program to acquire and decode bar code information according to the invention.

In accordance with practice of the present invention, FIG. 13 illustrates an exemplary block level flow chart of the operation of the wireless videophone when used as a means of capturing image data through the integral digital camera, in accordance with a downloaded bar code image capture program. In accordance with the invention, and as was described above in connection with the first embodiment, a customer would interface with the store server using the wireless telephone portion of the system, identify themselves appropriately to the server and download an appropriate purchase transaction program which recognizes the videographic image capture capability of the customer's wireless videophone.

After a program load is complete, the newly received purchase transaction program overwrites any previously received program which was stored in the system's program memory. The program loader transfers control to the loaded purchase transaction program which initiates execution and assumes control over the system's peripheral I/O devices such as the keyboard 244, microphone 300, IC ,card reader/writer 227, videographic display 242 and digital video camera 236. The purchase transaction program also assumes control over all transmit and receive functions of the wireless videophone.

With particular reference to FIG. 13, once the purchase transaction program has been downloaded, a purchaser may use the wireless videophone, in particular the digital camera, to select various items which the consumer desires to purchase. Such selection is made by capturing an image of an item's UPC bar code data, or the like, within the image field of the digital camera. While the consumer is scanning a particular bar code with the digital camera, the image seen by the camera is displayed on the system's graphic display screen so that the consumer can visually verify that the entire image has been captured. If character and/or pattern recognition software was downloaded to the system as part of the program, the customer need only inform the system that the image is ready for processing by pressing a pre-defined key on the system's keyboard. Those skilled in the art will appreciate that various other codes, indicia, text, icons, and the like may be scanned and recognized by modern character and pattern recognition application routines. Thus, product selection need not be made in accordance with a UPC bar code but might be made with reference to a selection of product specific icons, each of which represent a particular product or service offered for purchase. For example, when grocery shopping, product specific icons might represent the stylistic outlines of a loaf of bread, carton of milk, a bunch of broccoli, and the like, allowing a consumer to quickly and efficiently select items for purchase without recourse to the complications of reading bar codes.

However, no matter the form of the indicia captured by the digital video camera, the system operates in identical manner for each indicia and is governed solely by operation of the downloaded program which is coded to recognize either characters or patterns as appropriate to the application. However, in the following, the types of videographic images captured by the video camera will all be subsumed under the generic term "bar code" image data.

With reference to FIG. 13, the program is generally in an idle mode while waiting a function command which is typically issued by a consumer's depressing a particular function key, such as a pre-defined bar code read key, on the system's keyboard. Once a particular function key has been pressed, that function is then executed by the downloaded program. In the case of FIG. 13, if the bar code read key has been depressed the program captures the bar code image taken by the digital camera. Once the bar code image has been captured, the program decodes the bar code image data to its corresponding numeric bar code data, by operating on the bar code image with pattern recognition software. Once the bar code has been decoded to its numeric values, the bar code data is transmitted to the store's server through the wireless telephone function of the system.

Once in the server, the numeric bar code data is associated to a corresponding product which can be retrieved from a Price Look Up (PLU) table or file. An "item selection complete" response is then issued by the server and received by the customer's wireless videophone through its telephone function and the response is displayed to the customer on the system's integral graphics display screen. The response might include the numeric bar code data of the items selected for purchase as well as the item name, item price, and the like, in order that the consumer may confirm that this is, indeed, the item that they selected.

According to the present invention, the purchaser is given an opportunity to either confirm a purchase or to delete the item from the purchase list after each selection is made. The purchaser may also be given the choice to either confirm or delete each purchase selection once all purchase selections have been made prior to paying for the purchases. The purchaser indicates that all desired purchases have been made by depressing a pre-determined key of the system keypad. The wireless videophone then responds by displaying the total price of all purchases and also provides an opportunity to delete any or all of the purchases from the list as discussed above. After all the items to be purchased have been selected, the purchaser may pay for the transaction with an IC card, a credit card, a check card, or the like, by utilizing the system's optional IC card reader/writer unit. Alternatively, the purchaser might manually enter a credit card account number, expiration date and the like, into the wireless videophone using the keypad.

In addition to its use as a simple, efficient electronic shopping system, the wireless videophone of the present invention is not limited to use in retail transactions. Because its program download capability is not application specific, it will be understood that any application program of an appropriate size is able to be downloaded and executed by the wireless videophone of the invention. The program loader capability in combination with the system's digital video camera and graphics display screen allows the system to be eminently suitable for catalog shopping application, in which items are selected for purchase by merely scanning a printed bar code in proximity to an item on the catalog page.

Additionally, the system is easily adaptable for automatic telephone dialing when used in conjunction with a bar code phone book. Moreover, the system according to the invention is particularly useful for electronic selection applications in which bar code information is displayed on a screen, such as an LCD display or a computer CRT display. When such information is associated with the bar code, conventional scanner systems find it quite difficult to capture the bar code information from the screen, because of the surface scattering characteristics of such displays which interfere with proper irradiation of the bar code image by a conventional scanner's laser beam. The present invention, however, more easily captures such information because all that is required is that the bar code data fall within the visual image field of the system's digital camera. The present system is not required to irradiate the bar code with any form of coherent radiation in order to capture the image. This capability enables a consumer to read bar code information from a computer's display screen, particularly in cases where merchandise is sold in bulk, or by weight.

In particular, many grocery stores will have a consumer place an amount of merchandise onto a scale which has a small LCD display screen which displays the weight of the merchandise in bar code form. Using the present invention, a consumer is able to capture the bar code pertaining to the merchandise itself, from a shelf label for example, and then capture the bar code data from the scale display relating to the weight of the merchandise being purchased.

An alternative form of this kind of information capture is where a scale might include a merchandise selection methodology, such as a keypad device or a display screen implemented to include pressure sensitive regions (touch panel) defining merchandise selection criteria. As a customer places merchandise on the scale, the kind of merchandise is specified by using the merchandise selection device. The scale display screen is configured to display both the merchandise product code (i.e., a UPC code) and the weight of the item in bar code form. It should be noted that the item code and weight might be displayed as two different bar codes, or as a single bar code containing the combined information.

Notwithstanding the foregoing, it will also be understood that the merchandise item information need not be displayed in bar code form for the invention to perform as intended. Indeed, merchandise item information may be presented in alpha-numeric form (i.e., an item name) or as a numeric code. In either case, character recognition software allows the wireless videophone to identify the item in a seamless fashion. Character recognition software supports identifying a product based on a numeric or alpha-numeric code, while pattern recognition software supports recognition of product characteristics based on bar code data.

As was described above, pattern and/or character recognition can be accomplished by software downloaded to the wireless videophone, or, alternatively, by transmitting the videographic image of the numeric, alpha-numeric or bar code identifier to a server for such recognition processing. Processing results are then transmitted back to the wireless videophone for display to the customer.

It will be understood that the system of the present invention allows bar code and/or alpha-numeric information to be captured from almost any form of display means by merely placing the information within the visual image field of the system's digital camera. If the system's downloaded program includes pattern and/or character recognition routines, recognition data processing is performed within the video phone. Where the downloaded program does not include recognition software, the program transmits the videographic image to a server and a recognition processing software resident in the server processes the data and returns recognized merchandise information to the graphics display screen of the videophone. In its simplest form, the downloaded program might transmit videographic image data to a store server which, in turn, displays the information to a store clerk. The store clerk would then manually identify the merchandise associated with the transmitted data (bar code and/or alpha-numeric) and return identified merchandise information to the consumer's videophone graphics display screen.

Advanced pattern recognition software is able to enhance the performance of the wireless videophone, in accord with the invention, by offering the capability to capture merchandise information from items that are not identified by either a bar code or an alpha-numeric label. Advanced pattern recognition software allows a consumer to capture a videographic image of an apple, for example, and to have the apple be recognized as such by the pattern recognition software. This capability is useful for any merchandise item having a distinct or identifiable shape or other visually identifiable characteristic. Such pattern recognition is accomplished within the wireless videophone, by specialized downloaded software. Alternatively, a visual image of the merchandise item is transmitted to a server, wherein pattern recognition software makes the requisite merchandise item identification. Here too, the system allows for the videographic image of an item to be transmitted to a server, which displays the item to a store clerk for manual recognition and identification. Merchandise information is then returned to the customer for display by the wireless videophone.

It should be understood that the exemplary electronic shopping systems described herein and illustrated in the accompanying drawings represent only illustrated embodiments of the present invention. Indeed, various modifications and additions may be made to such embodiments without departing from the spirit and scope of the invention. For example, those skilled in the art will appreciate that various types of wireless telephones, other than conventional cellular telephones, are suitable for the practice of the present invention and as the communication basis for the above-described wireless videophone. Also, various means of wireless communication between the customer apparatus and the server are contemplated other than a cellular telephone system. In particular, the system might communicate using broadband RF microwave transmission techniques, and the like.

Moreover, the download program is not necessarily limited to purchase transaction applications. Any desired application program may similarly be downloaded to either a wireless telephone or a wireless videophone by a program loader. Therefore, any application program may be used by the wireless system. For example, the wireless videophone of the present invention may be utilized for ticket reservations, seat reservations, food ordering, text/voice/video guidance applications, information inquiry, and the like.

These and other modifications and additions will be obvious to those having skill in the art and may be implemented to adapt the present invention for use in a variety of different applications. Thus, the present invention is not intended to be limited by the foregoing illustrated embodiments, but only by the scope and spirit of the appended claims.

What is claimed is:

1. A program downloadable wireless videophone comprising:

a program memory for storing a downloaded transaction program;

a program loader comprising a firmware memory, the firmware memory containing instructions for downloading the transaction program from a server into the program memory;

a microprocessor for executing the instructions contained in the firmware memory of the program loader and for executing the downloaded transaction program stored in the program memory; and a digital camera in communication with the microprocessor, the digital camera being adapted to take pictures of visual images representing indicia of items to be purchased, the digital camera being further adapted to transmit visual image data associated with the acquired visual images to the server for indicating the items to be purchased.

2. An electronic transaction system comprising:

a server for storing a transaction program and for facilitating electronic transactions;

at least one wireless videophone for communicating with the server, the wireless telephone(s) comprising:

a program memory for storing a downloaded transaction program;

a program loader comprising a firmware memory, the firmware memory containing instructions for downloading the transaction program from a server into the program memory; and a microprocessor for executing the instructions contained in the firmware memory of the program loader and for executing the downloaded transaction program stored in the program memory; and a digital camera in communication with the microprocessor, the digital camera being adapted to take pictures of visual images representing indicia of items to be purchased, the digital camera being further adapted to transmit visual image data associated with the acquired visual images to the server for indicating the items to be purchased.

3. A program downloadable wireless videophone for facilitating performance of purchase transactions, the program downloadable wireless videophone comprising:

a program memory for storing a downloaded purchase transaction program;

a program loader comprising a firmware memory, the firmware memory containing instructions for downloading the purchase transaction program from a server into the program memory;

a microprocessor for executing the instructions contained in the firmware memory of the program loader and for executing the downloaded purchase transaction program stored in the program memory;

a digital camera in communication with the microprocessor for taking pictures of visual images representing indicia of products to be purchased and for transmitting visual image data associated with the acquired visual images to the server for indicating the products to be purchased; and an IC card reader/writer in communication with the microprocessor for facilitating payment for products purchased.

4. The program downloadable wireless videophone according to claim 3, wherein the purchase transaction program includes promotional messages specific to the particular seller.

5. An electronic shopping system for facilitating purchase transactions via a wireless videophone, the electronic shopping system comprising:
- a server for storing a purchase transaction program and for facilitating electronic purchase transactions; and
- at least one wireless videophone for communicating with the server, the wireless telephones comprising:
  - an antenna for receiving a radio frequency signal, the radio frequency signal comprising at least a purchase transaction program;
  - a radio frequency receiver/amplifier coupled to receive the radio frequency signal from the antenna for amplifying the radio frequency signal;
  - a demodulator coupled to receive the amplified radio frequency signal from the radio frequency receiver/amplifier for demodulating the amplified radio frequency signal;
  - a channel decoder coupled to receive a demodulated signal from the demodulator for separating non-speech and non-video digital data from the demodulated signal, the non-speech and non-video digital data comprising the purchase transaction program;
  - a program memory coupled to receive the purchase transaction program from the channel decoder for storing the purchase transaction program;
  - a program loader for downloading a purchase transaction program from the server into the program memory; and
  - a digital camera for taking pictures of visual images representing indicia of items to be purchased and for transmitting visual image data associated with the acquired visual images to the server for indicating the items to be purchased.

6. The electronic shopping system according to claim 5, wherein the server is disposed proximate a store with which purchase transactions are performed.

7. The electronic shopping system according to claim 5, wherein the server is disposed at a location which is remote from the store with which purchase transactions are performed.

8. The electronic shopping system according to claim 5, further comprising an extension PBX in communication with the server for facilitating wireless communication between the server and the wireless videophone(s).

9. The electronic shopping system according to claim 5, wherein the program loader comprises a firmware memory.

10. The electronic shopping system according to claim 5, wherein the program loader comprises a firmware memory, the firmware memory containing instructions which are executed to effect storage in the program memory of the purchase transaction program received by the wireless videophone.

11. The electronic shopping system according to claim 10, wherein the wireless videophone further comprises a microprocessor in communication with the program loader and the program memory for executing the instructions stored within the firmware memory of the program loader and for executing the purchase transaction program stored within the program memory.

12. The electronic shopping system according to claim 5, the wireless videophone further including pattern recognition software, the pattern recognition software recognizing the item indicia and translating the item indicia into a corresponding desired product identification.

13. The electronic shopping system according to claim 12, wherein the item indicia is a bar code, the pattern recognition software translating the bar code data into a numerical product identification.

14. The electronic shopping system according to claim 12, wherein the item indicia is a product specific pattern shape, the pattern recognition software translating the pattern shape data into a numerical product identification.

15. The electronic shopping system according to claim 5, the server configured to host a pattern recognition software program receiving the visual image data associated with the item indicia, the pattern recognition software program further recognizing the item indicia and translating the item indicia into a corresponding desired product identification.

16. The electronic shopping system according to claim 15, wherein the item indicia is a bar code, the pattern recognition program translating the bar code data into a numerical product identification.

17. The electronic shopping system according to claim 5, wherein the purchase transaction program includes promotional messages specific to the particular seller.

18. A program downloadable wireless videophone for bidirectional communication with an electronic shopping system server, comprising:
- a housing;
- a digital camera, disposed on a front end of the housing;
- a display screen disposed on the surface of the housing;
- bidirectional electronic communication circuitry, disposed within the housing, the circuitry including;
  - an antenna;
  - transceiver circuitry for transmitting and receiving radio frequency signals between the server and the videophone;
  - a demodulator coupled to demodulate radio frequency signals received from the server;
  - a channel decoder coupled to receive a demodulated signal from the demodulator, the channel decoder separating the received signal into voice, video and data portions;
  - program loader circuitry configured to download executable program instructions from the server, the executable program instructions comprising a data portion of the received signal; and
  - a program memory coupled to the program loader circuitry, the program memory storing the downloaded executable instructions; and
  - a microprocessor for executing the downloaded instructions for using the digital camera to take pictures of visual images representing indicia of items to be purchased and for transmitting visual image data associated with the acquired visual images to the server for indicating the items to be purchased.

19. The program downloadable wireless videophone according to claim 18, wherein the digital camera is rotatable.

20. The program downloadable wireless videophone according to claim 18, wherein the executable instructions comprise a purchase transaction program.

21. The program downloadable wireless videophone according to claim 20, wherein the program loader circuitry includes a firmware memory, the firmware memory containing instructions which are executed by the microprocessor to effect a download of the purchase transaction program and storage of the program within the program memory.

22. The program downloadable wireless videophone according to claim 21, wherein the acquired visual image is an item specific pattern image representing a desired item for processing by a pattern recognition software, the pattern recognition software recognizing said pattern and translating said pattern into an alpha-numeric character string corresponding to the item.

23. The program downloadable wireless videophone according to claim 22, wherein the item specific pattern image pattern is a bar code.

24. The program downloadable wireless videophone according to claim 23, wherein a bar code identifies particular ones of a plurality of items, the items defining an application selected from the group consisting of an electronic shopping system merchandise ordering display, a bar code telephone directory, a printed bar code identified merchandise catalog, and a product affixed identification label.

25. The program downloadable wireless videophone according to claim 18, wherein the item indicia corresponds to an item weight, the item weight being displayed on the display screen of an electronic scale.

26. The program downloadable wireless videophone according to claim 25, wherein the item indicia further includes a product identification in combination with an item weight.

27. The program downloadable wireless videophone according to claim 26, wherein the item indicia is a bar code.

28. The program downloadable wireless videophone according to claim 26, wherein the item indicia gives an alpha-numeric product identification.

29. The program downloadable wireless videophone according to claim 18, the server configured to host recognition software receiving the visual image data associated with the item indicia, the recognition software further recognizing the item indicia and translating the item indicia into a corresponding desired product identification.

30. A method for performing purchase transactions via a wireless videophone including a digital camera, the method comprising the steps of:
    calling a server with the wireless videophone;
    transmitting a radio frequency signal comprising a purchase transaction program to the wireless videophone, the radio frequency signal being received by an antenna of the wireless videophone;
    amplifying the radio frequency signal received by the antenna to provide an amplified radio frequency signal;
    demodulating the amplified radio frequency signal to provide a demodulated signal;
    separating the purchase transaction program from the demodulated signal; and
    using the purchase transaction program to perform a purchase transaction including using the digital camera for taking pictures of visual images representing indicia of items to be purchased and transmitting visual image data associated with the acquired visual images to the server for indicating the items to be purchased.

31. The method according to claim 30, wherein the step of storing the purchase transaction program comprises using a program loader to store the purchase transaction program.

32. The method according to claim 30, wherein the step of calling a server comprises calling a server disposed proximate a store where items are to be purchased.

33. The method according to claim 30, wherein the step of calling a server comprises calling a server disposed at a location remote from the store where items are to be purchased.

34. The method according to claim 30, wherein the step of calling a server comprises calling a server via an extension PBX.

35. The method according to claim 30, wherein the step of using the program to perform a purchase transaction comprises using an IC card reader/writer in communication with the wireless videophone to effect payment for a purchased item.

36. The method as recited in claim 30, further comprising the step of communicating by video via the wireless videophone to make an inquiry about a product while the purchase transaction program is being executed.

37. The method as recited in claim 30, further comprising the step of transmitting a video communication from the server to the wireless videophone while the purchase transaction program is being executed.

38. The method according to claim 30, wherein the visual indicia corresponding to an item to be purchased is an item weight.

39. The method according to claim 38, wherein the digital camera scans the item weight indicia from the display screen of an electronic scale.

40. The method according to claim 39, wherein the visual indicia further includes item identification information in combination with said item weight.

41. The method according to claim 40, wherein the visual indicia is presented in bar code form.

42. The method according to claim 40, wherein the visual indicia is presented in alpha-numeric form.

43. The method according to claim 30, wherein the visual indicia corresponding to an item to be purchased is a videographic image of said item.

44. The method according to claim 43, wherein the videographic image of an item to be purchased is recognized by pattern recognition software downloaded to the wireless videophone.

45. The method according to claim 43, wherein the videographic image of the item to be purchased is transmitted to the server, the videographic image of the item to be purchased being identified by pattern recognition software resident on said server.

46. The method according to claim 43, wherein the videographic image of the item to be purchased is transmitted to the server, the videographic image being manually identified by a store clerk.

47. A program downloadable wireless videophone comprising:
    a program memory for storing a downloaded transaction program from a particular seller, the transaction program allowing display of information in a format specified by the particular seller, the format being customized based on a purchaser's profile information;
    a program loader comprising a firmware memory, the firmware memory containing instructions for downloading the transaction program from a server into the program memory; and
    a microprocessor for executing the instructions contained in the firmware memory of the program loader and for executing the downloaded transaction program stored in the program memory.

48. The program downloadable wireless videophone according to claim 47, wherein the transaction program includes promotional messages specific to the particular seller.

49. The electronic transaction system according to claim 48, wherein the transaction program includes promotional messages specific to the particular seller.

50. An electronic transaction system comprising:
    a server for storing a transaction program and for facilitating electronic transactions;
    at least one wireless videophone for communicating with the server, the wireless telephone(s) comprising:
        a program memory for storing a downloaded transaction program from a particular seller, the transaction program allowing display of information in a format specified by the particular seller, the format being customized based on a purchaser's profile information;

a program loader comprising a firmware memory, the firmware memory containing instructions for downloading the transaction program from a server into the program memory; and a microprocessor for executing the instructions contained in the firmware memory of the program loader and for executing the downloaded transaction program stored in the program memory.

51. A program downloadable wireless videophone for facilitating performance of purchase transactions, the program downloadable wireless videophone comprising:

a program memory for storing a downloaded transaction program from a particular seller, the transaction program allowing display of information in a format specified by the particular seller;

a program loader comprising a firmware memory, the firmware memory containing instructions for downloading the transaction program from a server into the program memory; and a microprocessor for executing the instructions contained in the firmware memory of the program loader and for executing the downloaded transaction program stored in the program memory;

a digital camera in communication with the microprocessor for acquiring visual indicia indicating products to be purchased; and an IC card reader/write in communication with the microprocessor for facilitating payment for product purchased.

52. The program downloadable wireless videophone of claim 51, wherein the format specified by the particular seller is customized based on a purchaser's profile information.

53. An electronic shopping system for facilitating purchase transactions via a wireless videophone, the electronic shopping system comprising:

a server for storing a purchase transaction program and for facilitating electronic purchase transactions from a particular seller, the transaction program allowing display of information in a format specified by the particular seller, the format being customized based on a purchaser's profile information;

at least one wireless videophone for communicating with the server, the wireless telephone(s) comprising:

an antenna for receiving a radio frequency signal, the radio frequency signal comprising at least a purchase transaction program;

a receiver comprising:

a radio frequency receiver/amplifier coupled to receive the radio frequency signal from the antenna for amplifying the radio frequency signal;

a demodulator coupled to receive the amplified radio frequency signal from the radio frequency receiver/amplifier for demodulating the amplified radio frequency signal;

a channel decoder coupled to received a demodulated signal from the demodulator for separating non-speech and non-video digital data from the demodulated signal, the non-speech and non-video digital data comprising the purchase transaction program;

a program memory coupled to receive the purchase transaction program from the channel decoder for storing the purchase transaction program; and a program loader for downloading a purchase transaction program from the server into the program memory.

54. A program downloadable wireless videophone for bi-directional communication with an electronic shopping system server associated with a particular seller, comprising:

a housing;

a digital camera, disposed on a front end of the housing;

a display screen disposed on the surface of the housing;

bidirectional electronic communication circuitry, disposed within the housing, the circuitry including;

an antenna;

transceiver circuitry for transmitting and receiving radio frequency signals between the server and the videophone;

a demodulator coupled to demodulate radio frequency signals received from the server;

a channel decoder coupled to receive a demodulated signal from the demodulator, the channel decoder separating the received signal into voice, video and data portions;

a program loader circuitry configured to download executable program instructions from the server, the executable program instructions comprising a data portion of the received signal, the executable program instructions allowing display of information in a format specified by the particular seller; and a program memory coupled to the program loader circuitry, the program memory storing the downloaded executable instructions; and a microprocessor for executing the downloaded instructions.

55. The program downloadable wireless videophone according to claim 54, wherein the executable program instructions include promotional messages specific to the particular seller.

56. The program downloadable wireless videophone of claim 54, wherein the format specified by the particular seller is customized based on a purchaser's profile information.

57. A method for performing purchase transactions via a wireless videophone, the method comprising the steps of:

calling a server with the wireless videophone;

transmitting a radio frequency signal comprising a purchase transaction program from a particular seller to the wireless videophone, the purchase transaction program allowing display of information in a format specified by the particular seller, the format being customized based on a purchaser's profile information, and the radio frequency signal being received by an antenna of the wireless videophone;

amplifying the radio frequency signal received by the antenna to provide an amplified radio frequency signal;

demodulating the amplified radio frequency signal to provide a demodulated signal;

separating the purchase transaction program from the demodulated signal; and using the purchase transaction program to perform a purchase transaction.

58. The method according to claim 57, wherein the purchase transaction program includes promotional messages specific to a particular seller.

* * * * *

UNITED STATES PATENT AND TRADEMARK OFFICE
CERTIFICATE OF CORRECTION

PATENT NO. : 6,512,919 B2  
DATED : January 28, 2003  
INVENTOR(S) : Nobuo Ogasawara It is certified that error appears in the above-identified patent and that said Letters Patent is hereby corrected as shown below:

Title page,  
Item [56], References Cited, U.S. PATENT DOCUMENTS, insert the following:

| -- 5,334,824 | 8/1994  | Martinez.................. 235/380 |
| 5,465,288    | 11/1995 | Falvey et al. .............. 379/58 |
| 5,500,517    | 3/1996  | Cagliostro................. 235/486 |
| 5,608,778    | 3/1997  | Partridge..................349/58 |
| 5,625,673    | 4/1997  | Grewe et al. ...............379/61 |
| 5,675,524    | 10/1997 | Bernard....................364/705.05 |
| 6,222,520    | 4/2001  | Gerszberg et al. ..........345/113 |
| 5,999,207    | 12/1999 | Rodriguez et al. ..........348/14 |
| 5,760,824    | 6/1998  | Hicks, III..................348/14 |
| 5,559,868    | 9/1996  | Blonder....................379/96 --. |

Drawings,  
Fig. 4, in the descriptive legend of 136, delete "oscilator" and replace with -- oscillator --.  
Fig. 5, in the descriptive legend of 53, delete "PASSPORD" and replace with -- PASSWORD --.  
Fig 12. in the descriptive legend of 336, delete "oscilator" and replace with -- oscillator --.

Column 29,  
Line 23, delete "and";  
Line 31, delete "reader/write" and insert -- reader/writer --.  
Line 60, delete "received" and insert -- receive --.

Signed and Sealed this

Twenty-first Day of December, 2004

JON W. DUDAS  
*Director of the United States Patent and Trademark Office*